US009375990B2

(12) United States Patent
Kanda

(10) Patent No.: US 9,375,990 B2
(45) Date of Patent: Jun. 28, 2016

(54) SUSPENSION CONTROL DEVICE

(71) Applicant: HONDA MOTOR CO., LTD., Tokyo (JP)

(72) Inventor: Ryoma Kanda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 7 days.

(21) Appl. No.: 14/471,189

(22) Filed: Aug. 28, 2014

(65) Prior Publication Data
US 2015/0066295 A1 Mar. 5, 2015

(30) Foreign Application Priority Data
Aug. 30, 2013 (JP) .................................. 2013-179440

(51) Int. Cl.
B60G 17/019 (2006.01)
B60G 17/06 (2006.01)
(52) U.S. Cl.
CPC .......... B60G 17/01933 (2013.01); B60G 17/06 (2013.01); B60G 2400/0523 (2013.01); B60G 2400/104 (2013.01); B60G 2400/106 (2013.01); B60G 2400/208 (2013.01); B60G 2400/302 (2013.01); B60G 2400/32 (2013.01); B60G 2400/39 (2013.01); B60G 2400/41 (2013.01); B60G 2500/10 (2013.01)
(58) Field of Classification Search
None
See application file for complete search history.

(56) References Cited

U.S. PATENT DOCUMENTS

| 5,742,917 | A * | 4/1998 | Matsuno | B60K 17/3462 180/197 |
| 8,322,728 | B2 * | 12/2012 | Hirao | B60G 17/015 280/5.506 |
| 9,061,561 | B2 * | 6/2015 | Kikuchi | B60T 8/17555 |
| 9,061,562 | B2 * | 6/2015 | Hayakawa | B60G 17/01933 |
| 2010/0138107 | A1 * | 6/2010 | Morris | B60K 6/445 701/36 |
| 2014/0005889 | A1 * | 1/2014 | Hayakawa | B60G 17/01933 701/38 |
| 2015/0290995 | A1 * | 10/2015 | Kanda | B60G 17/0182 701/37 |

FOREIGN PATENT DOCUMENTS

JP 6-48139 A 2/1994

OTHER PUBLICATIONS

Japanese Office Action dated Oct. 6, 2015 (mailing date), issued in counterpart Japanese Patent Application No. 2013-179440 with English translation.

* cited by examiner

Primary Examiner — Yonel Beaulieu
Assistant Examiner — Krishnan Ramesh
(74) Attorney, Agent, or Firm — Westerman, Hattori, Daniels & Adrian, LLP

(57) ABSTRACT

Provided is a configuration including a basic input amount detecting unit configured to calculate a basic input amount of the vehicle, based on wheel speed fluctuation amount which a wheel speed sensor has detected; a first target current setting unit configured to set a first target current, based on the basic input amount; a second target current setting unit configured to set a second target current, based on vehicle acceleration detected by an acceleration sensor; and a damper control unit configured to control dampers, based on the first target current if a vehicle behavior control device is not operating, and based on the second target current if the vehicle behavior control device is operating.

11 Claims, 19 Drawing Sheets

SUSPENSION CONTROL DEVICE

CROSS REFERENCES TO RELATED APPLICATIONS

The present application claims priority under 35 U.S.C. §119 to Japanese Patent Application No. 2013-179440, filed Aug. 30, 2013, entitled "Suspension Control Device." The contents of this application are incorporated herein by reference in their entirety.

TECHNICAL FIELD

The present disclosure relates to a suspension control device for a vehicle including a variable-damping-force damper capable of adjusting damping force in accordance with input signals.

BACKGROUND

As of recent, various types of variable-damping-force damper used in automotive suspensions, capable of variable control of damping force in stepwise or non-stepwise, have been developed. Known mechanisms to change damping force include a mechanical type where the area of an orifice provided to a piston is changed by a rotary valve, and a magneto-rheological fluid (hereinafter, "MRF") type which uses MRF as an operating oil, in which the viscosity of the MRF is controlled by a magnetic fluid valve provided to the piston. Enabling control to change the damping force of the damper in accordance with the state in which the vehicle is being driven can improve operation safety and comfort of the ride.

One known technique to improve comfort of the ride is skyhook control, based on the skyhook theory. Skyhook control performs ride quality control (sprung damping control) requires detection of sprung speed, in order to set a target damping force to suppress vertical direction movement of the sprung mass. Even if the area of the orifice and the viscosity of the MRF is constant, damper properties exhibit change in damping force according to the stroke speed. Accordingly, the stroke speed, which is the relative displacement speed between the sprung mass and unsprung mass, needs to be detected in order to perform skyhook control.

Suspension control devices performing skyhook control according to the related art required vertical G sensors or stroke sensors to be mounted for each wheel, to detect the vertical speed of the sprung mass and the stroke speed. However, stroke sensors are attached in or nearby the wheel wells, thus securing installation space is difficult. In order to deal with this problem, there has been proposed a suspension control device which controls the damping force of the dampers without installing stroke sensors. This proposal describes calculating the relative displacement speed of sprung and unsprung masses, from the wheel speed fluctuation amount, and using the calculated relative displacement speed and so forth to control the damping force (see Japanese Unexamined Patent Application Publication No. 6-48139).

However, the suspension device according to Japanese Unexamined Patent Application Publication No. 6-48139 calculates the relative displacement speed between the sprung mass and unsprung mass. This is done taking advantage of the fact that when the wheels move vertically relative to the body in accordance with the geometry of the suspension, the wheel speed fluctuates due to the wheels moving relative in the longitudinal direction of the vehicle in accordance with the caster angle. This means that when the caster angle set to the suspension is small or zero, the relative displacement speed cannot be calculated, or the calculation precision deteriorates. Also, sprung speed is detected using vertical G sensors additionally installed, and this has been one factor in the high cost of suspension control devices which perform skyhook control.

Moreover, the relative displacement speed between the wheels and body is calculated with the suspension device in Japanese Unexamined Patent Application Publication No. 6-48139 based on wheel speed, meaning that if the wheels slip, control based on the relative displacement speed becomes inaccurate, thus there is the concern that vehicular behavior may become unstable. An arrangement may be conceived that the control current of the dampers is fixed when a vehicle behavior control device configured to stabilize vehicular behavior in cases of the wheels slipping or the like. However, this arrangement has problems in that fixing the control current when the damping force of the dampers is small, insufficient damping force may not be able to maintain the vehicle in an appropriate posture, and the unsprung components may thrash.

SUMMARY

It would be desirable to provide a suspension control device which can appropriately control the damping force of dampers regardless of the caster angle set to the suspension, and without installing vertical G sensors or stroke sensors. It would be also desirable to provide a suspension control device which can appropriately control body attitude when vehicular behavior is unstable, and prevent unsprung components from thrashing. In the following explanation of several aspects, specific elements with their reference numerals are indicated by using brackets. These specific elements are presented as mere examples in order to facilitate understanding, and thus, should not be interpreted as any limitation to the accompanying claims.

According to one aspect of the present disclosure, a suspension control device (20) for a vehicle (V) having variable-damping-force dampers (6) of which the damping force is adjustable based on input signals (Vw), includes: a wheel speed sensor (9) configured to detect wheel speed (Vw); a basic input amount calculating unit (37) configured to calculate a basic input amount ($U_1$) of the vehicle, based on wheel speed fluctuation amount ($\Delta$Vw) which the wheel speed sensor has detected; a first target current setting unit (22, 23) configured to set a first target current (Atgt1) as to the variable-damping-force of dampers, based on the basic input amount; an acceleration sensor (10, 11) configured to detect body acceleration (Gx, Gy) of the vehicle; a second target current setting unit (24) configured to set a second target current (Atgt2) as to the variable-damping-force dampers, based on the vehicle acceleration (Gx, Gy) detected by the acceleration sensor; and a damper control unit (26) configured to control damping force of the variable-damping-force dampers (6), based on at least one of the first target current and the second target current. The damper control unit (26) controls the damping force of the variable-damping-force dampers based on the first target current (Atgt1) in a case where a vehicle behavior control device (ABS, TCS, VSA), which controls behavior of the vehicle, is not operating, and controls the damping force of the variable-damping-force dampers based on the second target current (Atgt2) in a case where the vehicle behavior control device is operating. Note that the term "basic input amount" as used here means an external input amount from the road or the like to the wheels, unrelated to the geometry of the suspension.

According to this configuration, by calculating the basic input amount of the vehicle based on the detected amount of wheel speed fluctuation, an appropriate first target current corresponding to the quantity of state of the vehicle can be calculated from this value, and the damping force of the variable-damping-force dampers can be appropriately controlled. Accordingly, the vertical G sensors and stroke sensor needed with the related art can be omitted, and costs can be lowered. Also, the first target current can be appropriately set as to the dampers, unrelated to the caster angle set to the suspension. When the vehicle behavior control device is operating, the first target current based on the wheel speed fluctuation amount may be inappropriate. In such a case, controlling the damping force of the dampers based on the second target current set based on the vehicle acceleration enables the body attitude to be corrected, and unsprung thrashing to be prevented.

The acceleration sensor may include a longitudinal acceleration sensor (10) configured to detect acceleration (Gx) in the longitudinal direction of the vehicle, and a lateral acceleration sensor (11) configured to detect acceleration (Gy) in the lateral direction of the vehicle. The second target current setting unit may include a second pitch control unit (108) configured to set a second pitch control target current (Ap2) based on the longitudinal acceleration (Gx) of the vehicle that has been detected, a second roll control unit (109) configured to set a second roll control target current (Ar2) based on the lateral acceleration (Gy) of the vehicle that has been detected, and a second target current selecting unit (110) configured to selected the greater of the second pitch control target current and the second roll control target current as the second target current (Atgt2).

According to this configuration, even when the vehicle behavior is unstable and the vehicle behavior control device is operating, pitch control and roll control can be performed to correct the body attitude. Also, selecting the greater value of the second pitch control target current and second roll control target current as the second target current enables thrashing of the unsprung components due to insufficient damping force to be effectively prevented.

The second pitch control unit (108) may set the second pitch control target current such that the greater the longitudinal acceleration (Gx) of the vehicle is, the greater the second pitch control target current (Ap2) is.

According to this configuration, even when the vehicle behavior is unstable and the vehicle behavior control device is operating, pitching motion of the vehicle can be effectively suppressed.

The second roll control unit (109) may set the second roll control target current such that the greater the lateral acceleration (Gy) of the vehicle is, the greater the second roll control target current (Ar2) is.

According to this configuration, even when the vehicle behavior is unstable and the vehicle behavior control device is operating, rolling motion of the vehicle can be effectively suppressed.

The first target current setting unit may include a quantity-of-state calculating unit (31) configured to calculate a quantity of state ($S_2$, $S_s$) of the vehicle by inputting the basic input amount ($u_1$) to a vehicle model (38) representing behavior of the vehicle, and a skyhook control unit (90) configured to set a skyhook control target current (Ash) based on the quantity of state ($S_2$, $S_s$) of the vehicle. The first target current setting unit may set the first target current (Atgt1) based on the skyhook control target current (Ash).

According to this configuration, the quantity of state of the vehicle used for controlling the skyhook (sprung damping) of the variable-damping-force dampers can be calculated with high precision, by inputting the basic input amount of each wheel to a vehicle model. Accordingly, the quality of the ride can be improved by performing skyhook control.

The first target current setting unit may include a first pitch control unit (91) configured to set a first pitch control target current (Ap1) based on the basic input amount ($u_1$), the first target current setting unit setting the first target current (Atgt1) based on the first pitch control target current (Ap1).

According to this configuration, the first pitch control current corresponding to the longitudinal acceleration of the vehicle can be set from the basic input amount, and the pitch attitude of the body can be maintained correct by performing pitch control.

The first roll current setting unit may include a first roll control unit (92) configured to set a first roll control target current (Ar1) based on the basic input amount ($u_1$), the first roll current setting unit setting the first target current (Atgt1) based on the first roll control target current (Ar1).

According to this configuration, the first roll control current corresponding to the lateral acceleration of the vehicle can be set from the basic input amount, and the roll attitude of the body can be maintained correct by performing roll control.

BRIEF DESCRIPTION OF THE DRAWINGS

The advantages of the disclosure will become apparent in the following description taken in conjunction with the following drawings.

FIG. 11A is a time chart comparing sprung speed estimation values according to the single-wheel model illustrated in FIG. 4 with sensor values, and FIG. 11B is a time chart comparing stroke speed estimation values according to the single-wheel model illustrated in FIG. 4 with sensor values.

FIG. 17A is a time chart illustrating fluctuation amount of wheel acceleration before and after low-pass filter processing when traveling over a smooth road, and FIG. 17B is a time chart illustrating fluctuation amount of wheel acceleration before and after low-pass filter processing when traveling over a rough road.

DETAILED DESCRIPTION

Figure 1:
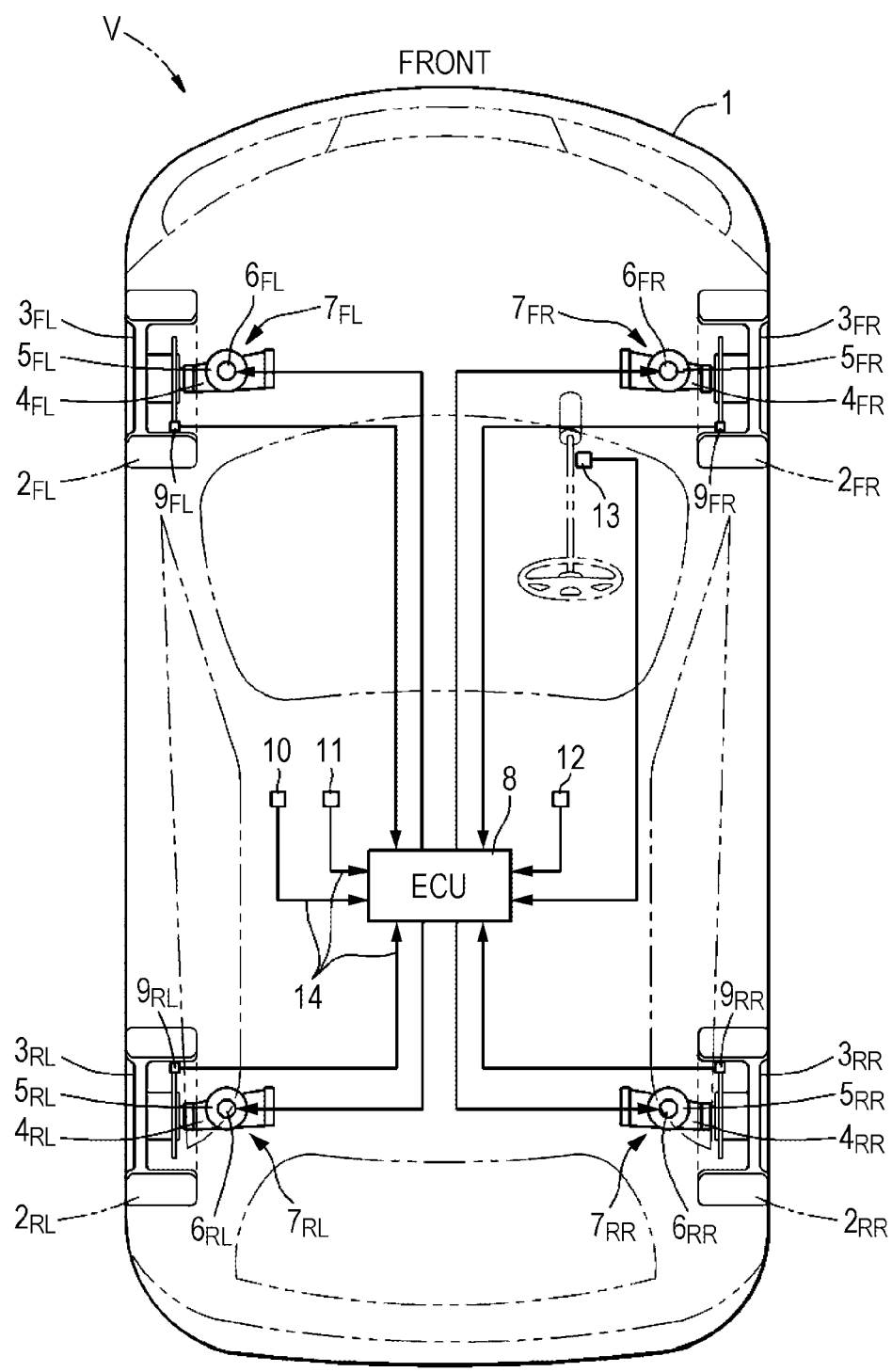
FIG. 1 is a schematic configuration diagram of a vehicle to which the suspension control device according to a first embodiment has been applied.

An embodiment of a suspension control device 20 applied to an automobile will be described in detail with reference to the drawings. Note that in the drawings, the four wheels 3 components disposed regarding each of the four wheels 3 such as dampers 6, elements regarding each of the four wheels 3 such as wheel speed Vw, and so forth, will have the reference numerals or reference symbols thereof followed by a suffix indicating which wheel that component or element is related to. For example in the case of the wheels 3, this will be written as wheel $3_{FL}$ (front left), wheel $3_{FR}$ (front right), wheel $3_{RL}$ (rear left), and wheel $3_{RR}$ (rear right). The suffixes may also be used collectively to indicate a plurality which is a part of the entirety, such as front wheels $3_F$, rear wheels $3_R$, for example.

First Embodiment

Schematic Configuration of Automobile V

First, the schematic configuration of the automobile V according to the first embodiment will be described with reference to FIG. 1. The body 1 of the automobile (vehicle) V has wheels 3 mounted with tires 2 at the front and rear, right and left. These wheels 3 are each suspended from the body 1 by a suspension 7 including a suspension arm 4, spring 5, variable damping force damper (hereinafter referred to simply as "damper") 6, and so forth. The automobile V further has mounted therein, at appropriate positions, an electronic control unit (ECU) 8 used for various types of control, wheel speed sensors 9 which detect the wheel speed Vw of the wheels 3 and which are installed for each wheel 3, a longitudinal G sensor 10 which detects longitudinal acceleration Gx of the body 1, a lateral G sensor 11 which detects lateral acceleration Gy of the body 1, a yaw rate sensor 12 which detects the yaw rate γ of the body 1, and a steering angle sensor 13 which detects the steering angle δf.

Even though omitted from the drawings, the automobile V includes one or both of Antilock Brake System (ABS) which prevents the wheels from locking when braking, and Traction Control System (TCS) which prevents wheels from spinning when accelerating. The automobile V further includes brake devices which can be controlled by known vehicle stability assist (VSA) control, which is a vehicle behavior stabilization control system having automatic braking functions for braking assistance. The ABS, TCS, and VSA determine that the vehicle is slipping by detecting that discrepancy between the detection value of the wheel speed sensor 9 and the wheel speed calculated based on the body speed Vb exceeds a certain level, or that discrepancy between a standard yaw rate set in accordance with steering angle δf, vehicle speed, or the like, and the detection values detected by the yaw rate sensor 12 (actual yaw rate) exceeds a certain level. In such a case, these systems perform optimal braking control or traction control in accordance with the driving state, so as to stabilize the behavior of the vehicle.

The automobile V also includes brake pressure sensors to detect the brake fluid pressure Pb of the brake devices, torque sensors to detect the driving torque Te, a gear position sensor to detect the gear position Pg of the transmission, and so forth, disposed at appropriate locations.

The ECU 8 is configured including a microcomputer, read-only memory (ROM), random access memory (RAM), peripheral circuits, input/output interfaces, various types of drivers, and so forth, which are connected to the dampers 6 of the wheels 3 and the sensors 9 through 13 and so forth, via a communication line (a controller area network (CAN) 14 in the present embodiment). The suspension control device 20 is made up of the ECU 8, these sensors 9 through 13, and so forth.

The dampers 6 according to the present embodiment are a monotube type (de Carbon type), though details are omitted from illustration. A piston rod is inserted in a cylindrical cylinder filled with MRF so as to be slidable in the axis direction. A piston mounted to the tip of the piston rod separates the inside of the cylinder into an upper oil chamber and lower oil chamber. The piston includes a communication channel by which the upper oil chamber and lower oil chamber communicate, and an MLV coil situated on the inner side of the communication channel.

The lower end of the cylinder of the damper 6 is linked to the upper face of the suspension arm 4 which is a member on the wheel side, and the upper end of the piston rod is linked to a damper base (upper portion of the wheel well), which is a body side member. Schematically illustrated in FIG. 2, each damper 6 links together unsprung mass (all movable members beneath the suspension spring, including the wheel 3, knuckle, and suspension arm 4) having a mass $M_1$, and sprung mass made up of the body 1, having a mass $M_2$, along with the springs 5.

Upon electric current being supplied from the ECU 8 to the MLV coil, a magnetic field is applied to the MRF flowing through the communication channel, and the ferromagnetic particles form chain-like clusters. Thus, the apparent viscosity of the MRF passing through the communication channel (hereinafter referred to simply as "viscosity") increases, and the damping force of the damper 6 increases.

ECU 8

Next, a schematic configuration of the ECU 8 which controls the damper 6 and is a component of the suspension control device 20, will be described there with reference to FIG. 3. In practice, the ECU 8 performs control of the ABS, TCS, and VSA, besides control of the damper 6, but description of vehicle behavior control units which perform such control will be omitted here.

The ECU 8 includes an input unit 21 to which the above-described sensors 9 through 13, vehicle behavior control units, and so forth are connected via the CAN 14, and a vehicle quantity-of-state estimation unit 22 which estimates the quantity of state of the automobile V from detection signals from the sensors 9 through 13 and so forth. The ECU 8 also includes a first control target current setting unit 23 which sets various types of control target currents of the dampers 6 from various values calculated at the vehicle quantity-of-state estimation unit 22 and detection signals from the sensor 9 through 13, and selects a first target current Atgt1 from these target currents to improve the steering stability and comfort of ride of the automobile V, and a second control target current setting unit 24 which sets various types of control target currents of the dampers 6 from detection signals from the sensor 10 and 11, and selects a second target current Atgt2 from these target currents to improve the steering stability and comfort of ride of the automobile V. The ECU 8 further includes a switchover signal output unit 25 which outputs a switchover signal Sc to switch over driving current of the dampers 6 in accordance with predetermined conditions, and a damper control unit 26 which generates driving current to the dampers 6 (more particularly, the MLV coils) based on one of the first target current Atgt1 set by the first control target current setting unit 23 and the second target current Atgt2 set by the second control target current setting unit 24, thereby controlling the damping force of the dampers 6.

Vehicle Quantity-of-State Estimation Unit 22

The vehicle quantity-of-state estimation unit 22 estimates the quantity of state of the automobile V using the fact that a wheel speed fluctuation amount $\Delta Vw$ has a relation to a certain degree with a ground contact load fluctuation amount of the wheels 3. The vehicle quantity-of-state estimation unit 22 includes a quantity-of-state calculating unit 31 which estimates, for each wheel, various types of quantity of states of the automobile V using vehicle modes, based on the detection values of the wheel speed sensor 9, and a body speed estimating unit 32 which calculates a body speed Vb which is a wheel speed correction amount as to the quantity-of-state calculating unit 31 (inner wheel side body speed Vbi and outer wheel side body speed Vbo). The quantity-of-state calculating unit 31 includes a single-wheel model calculating unit 33 and for each of the four wheels (front and rear, right and left), a four-wheel model calculating unit 34, a slip determining unit 50 (see FIG. 4). The body speed estimating unit 32 includes an acceleration/deceleration calculating unit 51, a steering correction amount calculating unit 53 which calculates correction amount regarding steering operations, and so forth. Each part of the vehicle quantity-of-state estimation unit 22 will be described in detail with reference to FIGS. 4 through 11B.

Quantity-of-State Calculating Unit 31

Figure 4:
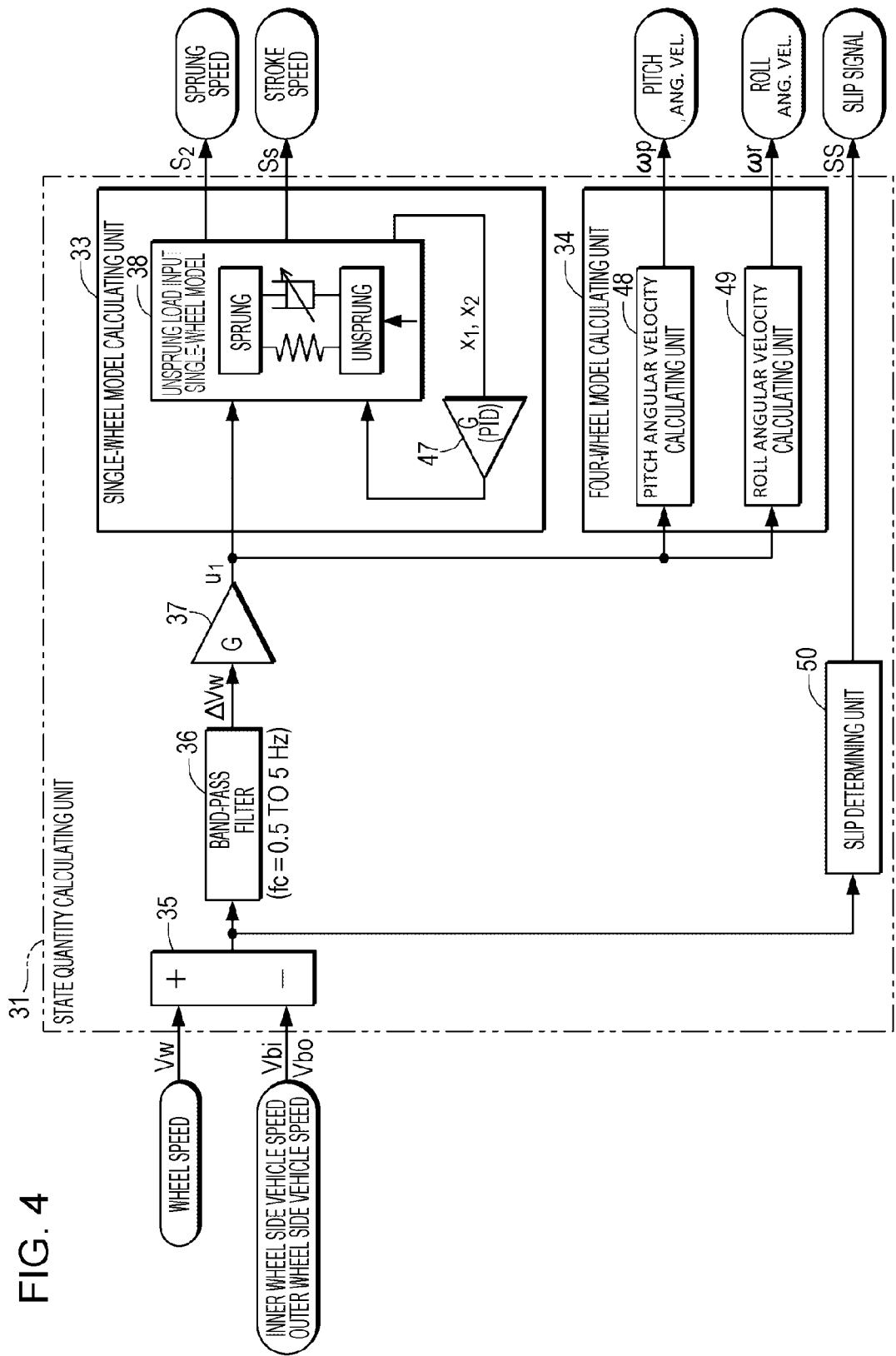
FIG. 4 is a block diagram illustrating a quantity-of-state estimating device illustrated in FIG. 3.

As illustrated in FIG. 4, in the quantity-of-state calculating unit 31, the input wheel speed Vw (signal) is input to a subtractor 35 as an addition value. The later-described inner wheel side body speed Vbi or outer wheel side body speed Vbo has been input to the subtractor 35 as a subtraction value, and by subtracting the inner wheel side body speed Vbi or outer wheel side body speed Vbo from the wheel speed Vw at the subtractor 35, the wheel speed Vw is corrected. The subtractor 35 also functions as a wheel speed fluctuation amount calculating unit to calculate the wheel speed fluctuation amount $\Delta Vw$ based on the wheel speed Vw.

The inner wheel side body speed Vbi or outer wheel side body speed Vbo input to the subtractor 35 has been calculated to remove the wheel speed fluctuation component due to path length difference due to change in vehicle speed of the automobile V and the difference in turning radii at the inner wheels and outer wheels. That is to say, the subtractor 35 subtracts the inner wheel side body speed Vbi or outer wheel side body speed Vbo calculated at the body speed estimating unit 32 from each wheel speed Vw before input to a band-pass filter 36, thus functioning as a correction unit to perform correction processing of removing body speed Vb components due to driver operations, from the wheel speed Vw.

The wheel speed Vw output from the subtractor 35 is input to a gain circuit 37 via the band-pass filter 36. The band-pass filter 36 has band-pass properties to allow 0.5 to 5 Hz frequency components to pass. In the present embodiment, the CAN 14 is used as the communication line, and wheel speed Vw signals are input at a refresh cycle of around 10 to 20 msec, so the band-pass filter 36 has low-pass properties to allow bands below around 5 Hz to pass. Thus, high-frequency components can be shut out and sprung resonance band frequency components (signals of frequencies corresponding to sprung vibration) can be extracted in a sure manner. In the other hand, in a case where the wheel speed Vw signals are input in a shorter refresh cycle, a band-pass filter 36 having low-pass properties of a higher band range such as 20 Hz for example may be used, so that unsprung resonance band frequency components can also be extracted.

The band-pass filter 36 also has high-pass properties to allow bands above around 0.5 Hz to pass, so as to remove the DC component from the wheel speed Vw signals which are continuously input. Accordingly, body speed Vb components due to driver operations (body speed component due to braking/driving) can be removed from the low-frequency range signals of 5 Hz or lower, corresponding to sprung vibrations. That is to say, the band-pass filter 36 functions as a wheel speed fluctuation amount extracting unit to extract the wheel speed fluctuation amount $\Delta Vw$ based on the wheel speed Vw. Now, since the DC component can be removed from the wheel speed Vw signals by the band-pass filter 36, an arrangement may be made where the subtractor 35, which subtracts the body speed Vb from the wheel speed Vw, is omitted.

The gain circuit 37 converts the wheel speed fluctuation amount $\Delta Vw$ at each wheel into unsprung load $u_1$, taking advantage of the correlation between the wheel speed fluctuation amount $\Delta Vw$ and the unsprung load $u_1$ (ground load fluctuation amount). The relation between the wheel speed fluctuation amount $\Delta Vw$ and the unsprung load $u_1$ which the gain circuit 37 uses will now be described.

Figure 5A:
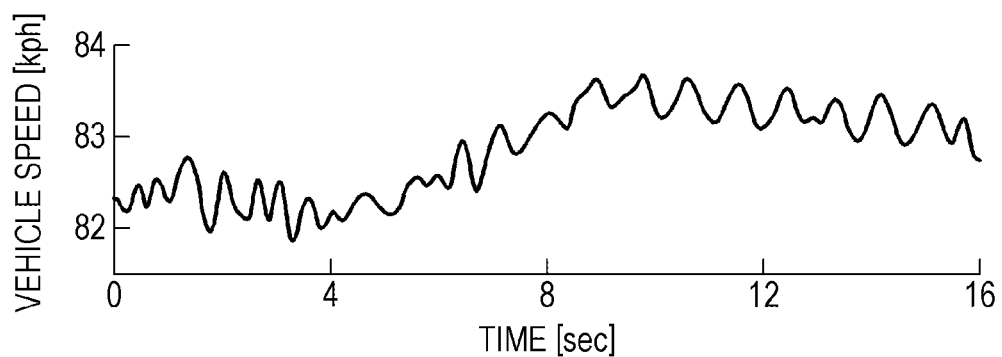
FIGS. 5A and 5B are time charts illustrating the relation between wheel speed and ground contact load, in the unsprung load single-wheel model illustrated in FIG. 4.
Figure 5B:
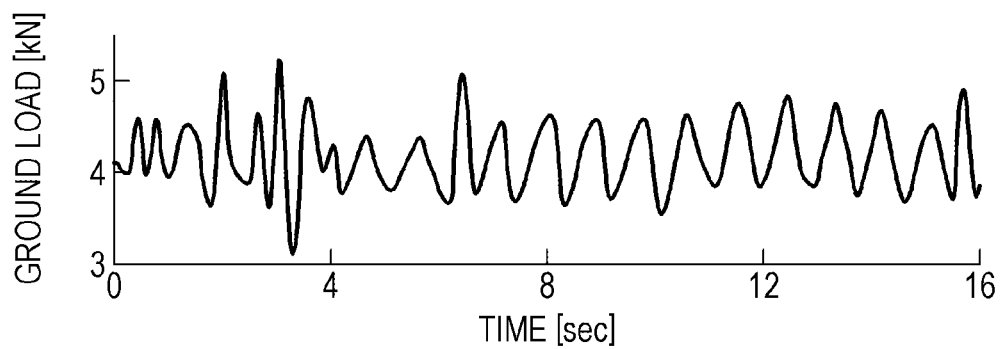

For example, in a case where an automobile V is traveling straight on a smooth road at a constant speed, the ground contact load of the wheels 3 is constant, and the wheel speed Vw also is constant. Now, the ground contact portion of the tires 2 is deformed in accordance with the ground contact load (unsprung mass $M_1$+sprung mass $M_2$), and the dynamic rolling radius Rd of the tires 2 is smaller than when there is no load. However, as the ground contact load increases/decreases due to roughness on the road surface when traveling around 80 km/h for example, as illustrated in FIG. 5B, the wheel speed also increases/decreases as illustrated in FIG. 5A due to change in the dynamic rolling radius Rd of the tires 2. The ground contact load fluctuates by around 1 Hz due to bouncing on the road surface, and in the same way, the wheel speed Vw also fluctuates by around 1 Hz. Note that the wheel speed Vw and ground contact load are both sensor detection values.

Figure 6:
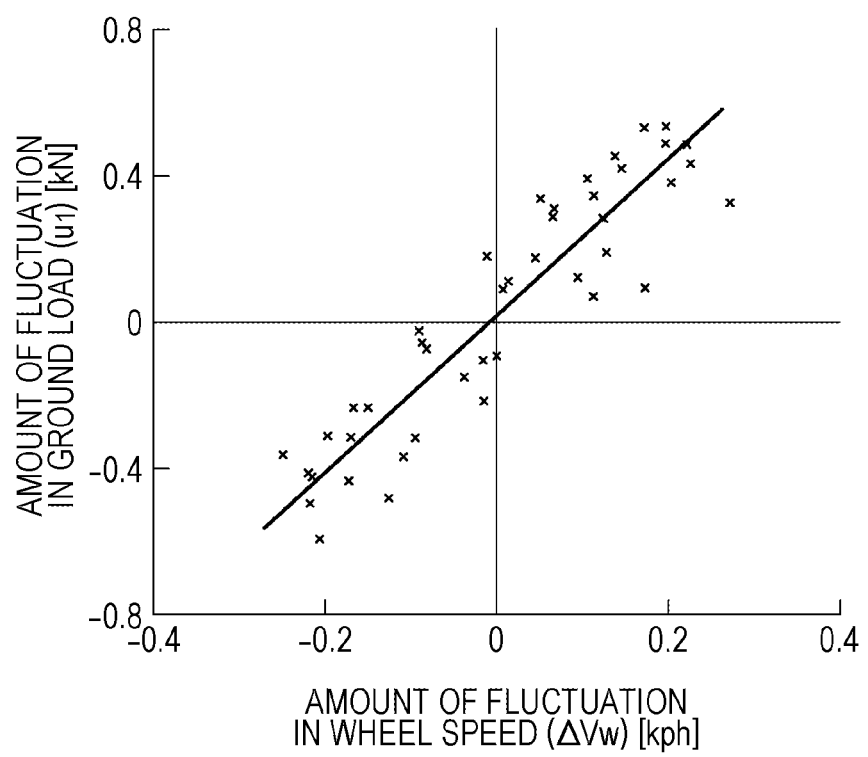
FIG. 6 is a graph illustrating the relation between wheel speed fluctuation amount and ground contact load fluctuation amount, in the unsprung load single-wheel model illustrated in FIG. 4.

FIG. 6 is a graph where the horizontal axis is the wheel speed fluctuation amount $\Delta Vw$ obtained by subjecting the detection signals of both sensors to band-pass processing (through a 0.5 to 2 Hz band-pass filter in this case), and the vertical axis is the ground contact load fluctuation amount. As can be seen from FIG. 6, the wheel speed fluctuation amount $\Delta Vw$ is in a proportionate relation with the ground contact load fluctuation amount, and can be expressed as $$u_1 = k \Delta Vw$$

where k is a proportionality constant.

Accordingly, the gain circuit 37 in FIG. 4 calculates the unsprung load $u_1$ for each wheel by multiplying the wheel speed fluctuation amount ΔVw by the proportionality constant k. That is to say, the gain circuit 37 functions as a basic input amount calculating unit to calculate the unsprung load $u_1$ which is a basic input amount of the automobile V, based on the wheel speed fluctuation amount ΔVw detected by the wheel speed sensor 9.

Thus, performing correction to remove the body speed Vb component from the wheel speed Vw signals allows the wheel speed fluctuation amount ΔVw to be accurately calculated without being affected by vehicle speed fluctuations. Also, passing the wheel speed Vw signals through the band-pass filter 36 corresponding to sprung vibrations allows the unsprung load $u_1$ to be accurately calculated based on the wheel speed fluctuation amount ΔVw. Cutting out frequency bands corresponding to the unsprung vibrations by the band-pass filter 36 allows for a more general-use suspension control device 20, without unnecessarily high detection precision by the wheel speed sensor 9 and unnecessarily high calculation frequency and communication speed.

Single-Wheel Model Calculating Unit 33

The unsprung load $u_1$ output from the gain circuit 37 is input to a single-wheel model 38 included in the single-wheel model calculating unit 33. The single-wheel model calculating unit 33 inputs the unsprung load $u_1$ to the single-wheel model 38, thereby calculating to output quantities of state of the automobile V such as sprung speed $S_2$ and stroke speed Ss of the suspension 7, used for calculation at the skyhook control unit 90. That is to say, the single-wheel model 38 serves as a quantity-of-state calculating unit which can calculate various types of quantities of state of the automobile V by handling the wheel speed fluctuation amount ΔVw as an external force.

Figure 2:
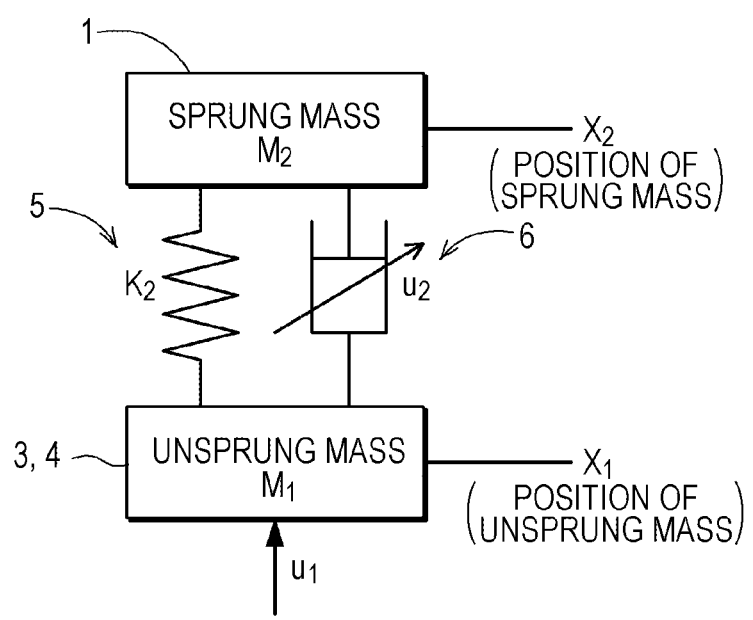
FIG. 2 is a model diagram illustrating the suspension illustrated in FIG. 1.

Describing an example of the single-wheel model 38 in further detail, the wheels 3 of the automobile V can be expressed as illustrated in FIG. 2 as described earlier, and the unsprung load $u_1$ of the wheel 3 can be expressed as in the following Expression (1) as input u. Note that in the Expressions in the present Specification and in the drawings, the first order differential value (dx/dt) and second order differential value ($d^2x/dt^2$) are represented as $$dx/dt = \dot{x},$$

$$d^2x/dt^2 = \ddot{x}$$

$$u = M_1\ddot{x}_1 + M_2\ddot{x}_2 \quad (1)$$

where $M_1$ represents unsprung mass, $M_2$ represents sprung mass, $x_1$ represents unsprung vertical-direction position, $x_2$ represents sprung vertical-direction position, $d^2x_1/dt^2$ represents unsprung vertical-direction acceleration, and $d^2x_2/dt^2$ represents sprung vertical-direction acceleration.

Now, the unsprung mass $M_1$ and sprung mass $M_2$ are known values. On the other hand, the input u includes the unsprung load $u_1$, and also includes damping force $u_2$ of the dampers 6 since the damping force of the dampers 6 is variable. This damping force $u_2$ of the dampers 6 can be obtained in the single-wheel model 38 based on the unsprung load $u_1$. Now, once the unsprung load $u_1$ has been calculated based on the wheel speed Vw, the unsprung load $u_1$ and the damping force $u_2$ of the dampers 6 calculated based on the unsprung load $u_1$ can be taken as input u, and a system matrix used taking into consideration the sprung and unsprung spring constant K (spring constant of the spring 5), unsprung mass $M_1$, and sprung mass $M_2$. This allows the unsprung vertical-direction acceleration $d^2x_1/dt^2$ and sprung vertical-direction acceleration $d^2x_2/dt^2$, the unsprung vertical-direction position $x_1$, and the unsprung speed dx/dt and so forth to be obtained. Note that the stroke speed Ss can be expressed as $dx_2/dt - dx_1/dt$.

Describing this in more detail, the $M_1 \cdot d^2x_1/dt^2$ and $M_2 \cdot d^2x_2/dt^2$ in the Expression (1) above can be expressed as in the following Expressions (2) and (3)

$$M_1\ddot{x}_1 = u_1 - K_2(x_1 - x_2) - u_2 \quad (2)$$

$$M_2\ddot{x}_2 = K_2(x_1 - x_2) + u_2 \quad (3)$$

where $U_1$ represents unsprung load, $u_2$ represents damping force of the dampers 6, and K is a spring constant.

Now, the single-wheel model 38 takes the equation of state in the following Expression (4) as a model, and calculates, from the input vector u, a state variable x in the following Expression (5)

$$\dot{x} = Ax + Ru \quad (4)$$

$$x = [x_1 x_2 \dot{x}_1 \dot{x}_2]^T \quad (5)$$

where x represents a state variable vector, and A and B are system matrices. From the above Expressions (2) through (5), Expression (4) can be expressed as the following Expression (6).

$$\dot{x} = \begin{bmatrix} \dot{x}_1 \\ \dot{x}_2 \\ \ddot{x}_1 \\ \ddot{x}_2 \end{bmatrix} = \begin{bmatrix} 0 & 0 & 1 & 0 \\ 0 & 0 & 0 & 1 \\ \frac{-K_2}{M_1} & \frac{K_2}{M_1} & 0 & 0 \\ \frac{K_2}{M_2} & \frac{-K_2}{M_2} & 0 & 0 \end{bmatrix} \begin{bmatrix} x_1 \\ x_2 \\ \dot{x}_1 \\ \dot{x}_2 \end{bmatrix} + \begin{bmatrix} 0 & 0 \\ 0 & 0 \\ \frac{1}{M_1} & -\frac{1}{M_1} \\ 0 & \frac{1}{M_2} \end{bmatrix} \begin{bmatrix} u_1 \\ u_2 \end{bmatrix} \quad (6)$$

Figure 7:
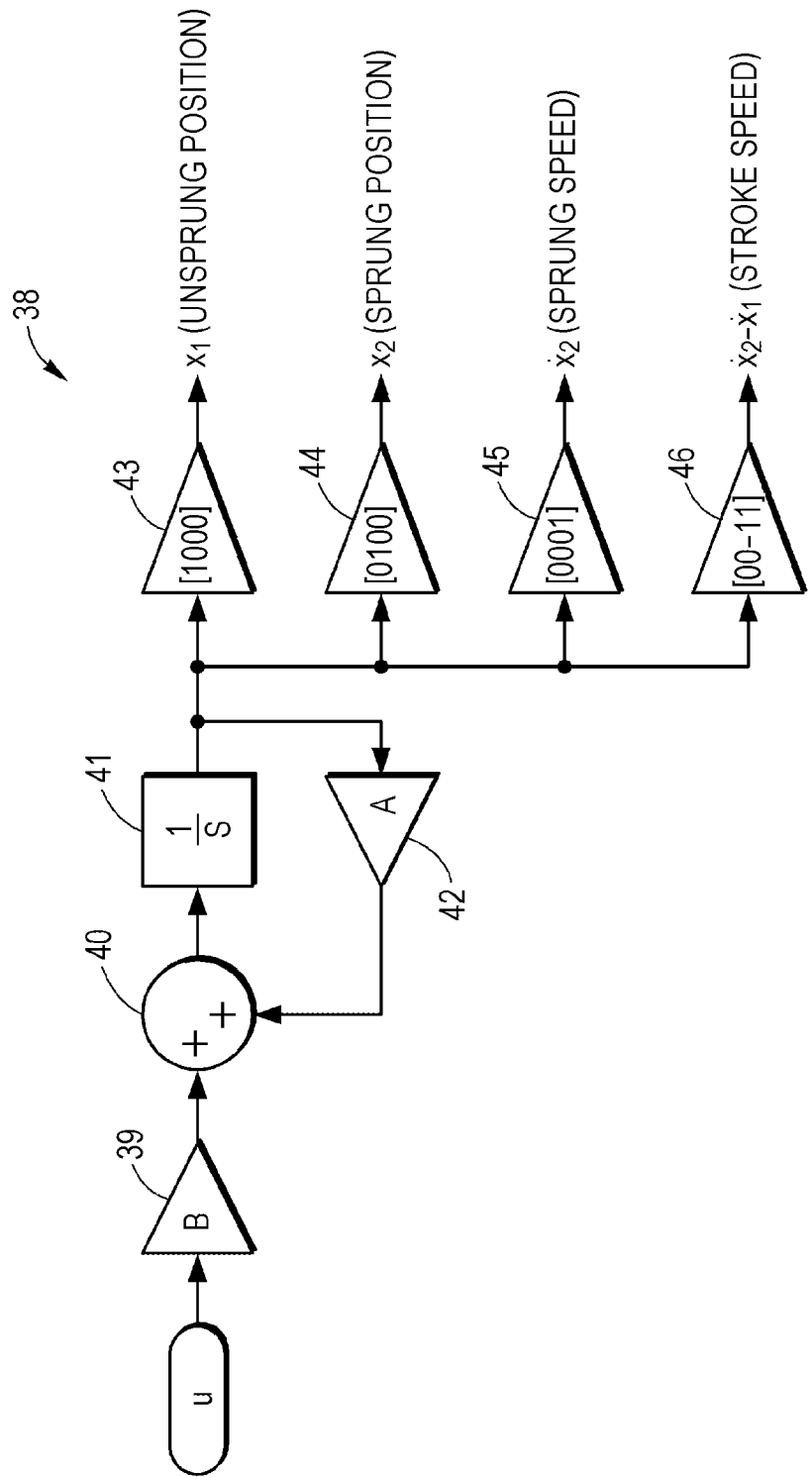
FIG. 7 is a block diagram of the unsprung load single-wheel model calculating unit illustrated in FIG. 4.

The single-wheel model 38 using this equation of state inputs the input u into a computing unit 39 which uses the system matrix B as illustrated in FIG. 7, inputs the output from the computing unit 39 to an integrating unit 41 via an adder 40, inputs the output from the integrating unit 41 to a computing unit 42 using the system matrix A, and returns to the adder 40. The outputs of first through fourth observation matrices 43 through 46 are obtained from the single-wheel model 38, thus enabling the unsprung position $x_1$, sprung position $x_2$, sprung speed $S_2$ ($d^2x_2/dt^2$), and stroke speed Ss ($dx_2/dt - dx_1/dt^2$) to be calculated. Note that the first observation matrix 43 is an unsprung position observation matrix, and is [1 0 0 0]. The second observation matrix 44 is a sprung position observation matrix, and is [0 1 0 0]. The third observation matrix 45 is a sprung speed observation matrix, and is [0 0 0 1]. The fourth observation matrix 46 is a stroke speed observation matrix, and is [0 0 −1 1]. The first through fourth observation matrices 43 through 46 at the single-wheel model 38 are each ways to calculate the unsprung position $x_1$, sprung position $x_2$, sprung speed $S_2$, and stroke speed Ss, from the wheel speed fluctuation amount ΔVw.

As described above, by inputting the unsprung load $u_1$ calculated based on the wheel speed Vw into the single-wheel model 38, the sprung speed $S_2$ and stroke speed Ss can be calculated regardless of whether a caster angle has been set for the suspension 7. Being able to calculate the sprung speed $S_2$ and stroke speed Ss from the unsprung load $u_1$ means that there is no need to provide the automobile V with vertical G sensors and stroke sensors, thereby reducing costs of the suspension control device 20.

Now, returning to FIG. 4, the single-wheel model calculating unit 33 has a proportional-integral-derivative (PID) circuit 47 serving as a feedback unit to perform feedback of the unsprung vertical-direction position $x_1$ and sprung vertical-direction position $x_2$ calculated at the single-wheel model 38. Thus, the single-wheel model calculating unit 33 has the unsprung position $x_1$ and sprung position $x_2$ corrected based on deviation of the unsprung position $x_1$ and sprung position $x_2$, from the unsprung reference position $x_10$ and sprung reference position $x_20$, so that the sprung position $x_2$ and unsprung position $x_1$ of the single-wheel model 38 in a normal state of traveling straight on a flat and smooth road at a constant speed, converge on the standard positions (initial values).

Accordingly, the unsprung load $u_1$ is adjusted with reference to the reference position, so if an offset is input to one, error occurring in the sprung speed $S_2$ and stroke speed Ss due to offset occurring at the entire system can be suppressed. Data can also be used at other control systems as well.

Thus, the single-wheel model calculating unit 33 functions as a position calculating unit which calculates the unsprung position $x_1$ and sprung position $x_2$, by obtaining the first observation matrix 43 and second observation matrix 44 from the single-wheel model 38 with the unsprung load $u_1$ and damping force $u_2$ of the damper 6 as input. Note that while the arrangement described here is one where with regard to the single-wheel model calculating unit 33, the PID circuit 47 performs feedback of both the unsprung position $x_1$ and sprung position $x_2$, an arrangement may be made where the PID circuit 47 performs feedback of at least one of the unsprung position $x_1$ and sprung position $x_2$, so as to correct the unsprung position $x_1$ and sprung position $x_2$. The sprung speed $S_2$ and stroke speed Ss calculated at the single-wheel model calculating unit 33 are input to the skyhook control unit 90, as illustrated in FIG. 3.

Four-Wheel Model Calculating Unit 34

As illustrated in FIG. 4, the four-wheel model calculating unit 34 included in the quantity-of-state calculating unit 31 includes a pitch angular velocity calculating unit 48 and roll angular velocity calculating unit 49. The unsprung load $u_1$ output from the gain circuit 37 is input to the pitch angular velocity calculating unit 48 and roll angular velocity calculating unit 49. The pitch angular velocity calculating unit 48 calculates the acceleration (longitudinal acceleration Gx) of the automobile V based on the difference in unsprung load $u_1$ between the front and rear wheels (based on the wheel speed Vw) input thereto, and calculates a pitch angular velocity ω based on the calculated acceleration/deceleration, suspension properties, sprung mass $M_2$, and so forth. On the other hand, the roll angular velocity calculating unit 49 calculates lateral direction acceleration (lateral acceleration Gy) of the automobile V based on the difference in unsprung load $u_1$ between the left and right wheels (based on the wheel speed Vw) input thereto, and calculates a roll angular velocity ωr based on the calculated lateral acceleration, suspension properties, sprung mass $M_2$, and so forth. Note that the pitch angular velocity ωp is input to a first pitch control unit 91, and the roll angular velocity ωr is input to a first roll control unit 92, as illustrated in FIG. 3.

Slip Determining Unit 50

The wheel speed Vw output from the subtractor 35, i.e., the deviation between the wheel speed Vw for each wheel and the estimated body speed Vb, is input to the slip determining unit 50. The slip determining unit 50 determines whether or not the absolute value of the input wheel speed Vw (deviation) is at or greater than a predetermined value, which is to say whether or not the deviation of the wheel speed Vw detected by the wheel speed sensor 9 from the body speed Vb is at or greater than a predetermined value. In a case where this is equal to or greater than the predetermined value, determination is made that the corresponding wheel 3 is slipping, and a slip signal SS is output. The output slip signal SS is input to a vehicle behavior control unit which is not illustrated, that controls the ABS, TCS, and VSA. Once the slip signal SS is input and one of the ABS, TCS, and VSA is operated, the vehicle behavior control unit inputs an operation signal indicating the operation thereof to the input unit 21.

Body Speed Estimating Unit 32

Figure 3:
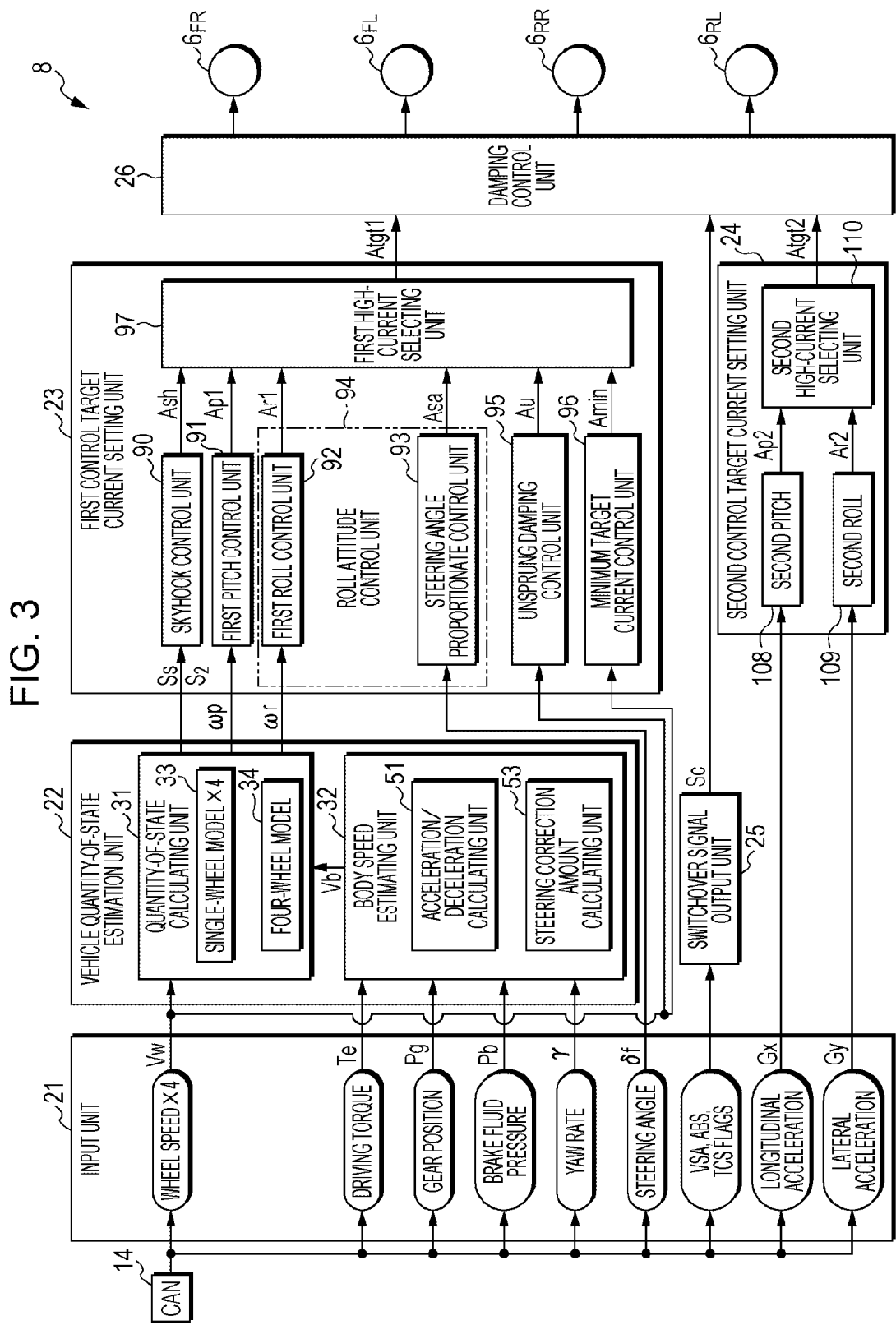
FIG. 3 is a block diagram schematically illustrating the configuration of the suspension control device illustrated in FIG. 1.
Figure 8:
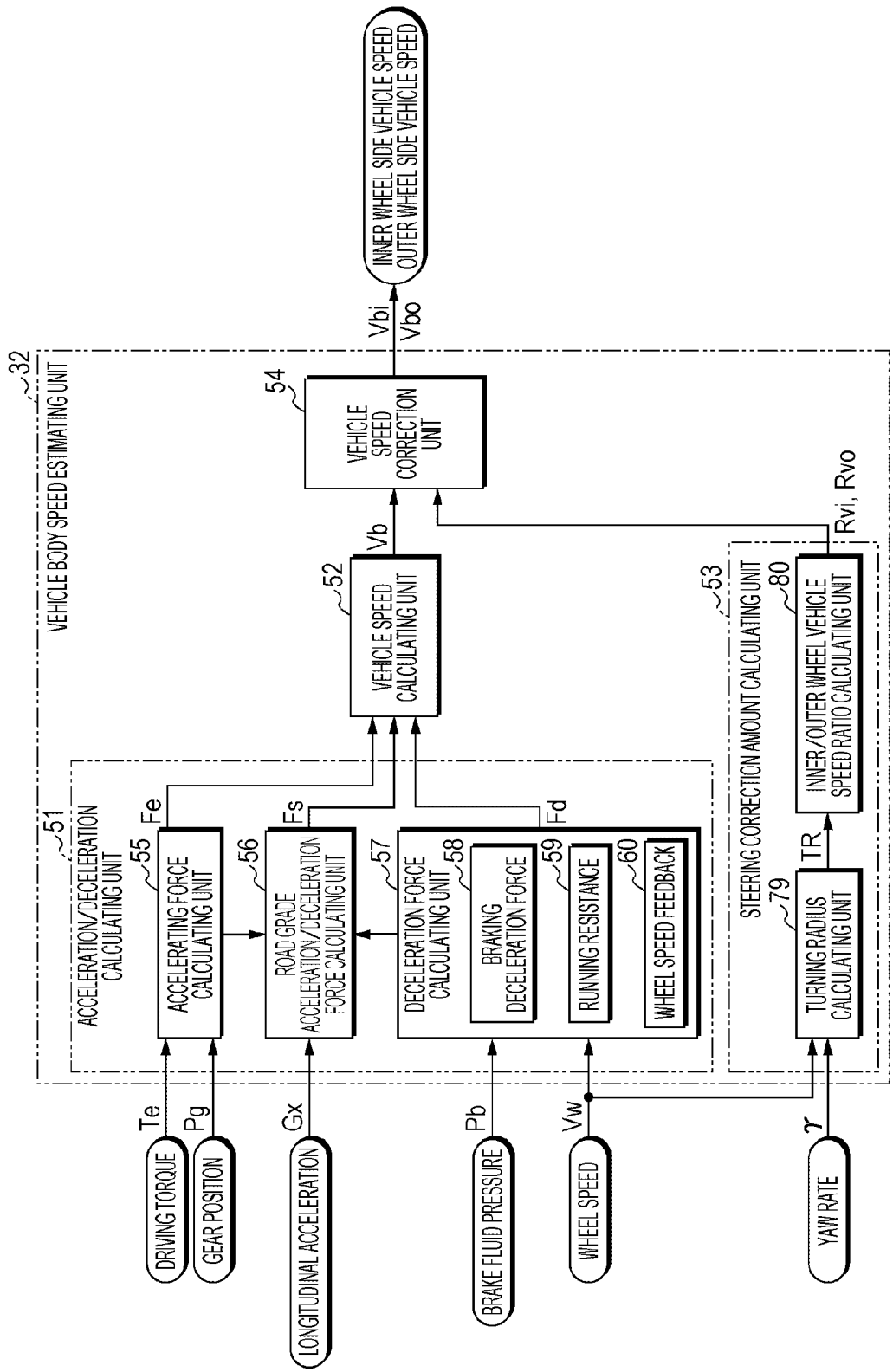
FIG. 8 is a block diagram of the body speed estimating unit illustrated in FIG. 3.

As illustrated in FIG. 8, the body speed estimating unit 32 in FIG. 3 includes an acceleration/deceleration calculating unit 51 which calculates acceleration/deceleration F (Fe, Fs, Fd) of the automobile V, a vehicle speed calculating unit 52 which calculates the body speed Vb based on the acceleration/deceleration calculated at the acceleration/deceleration calculating unit 51, a steering correction amount calculating unit 53 which calculates a correction amount according to steering operations (later-described inner wheel body speed ratio Rvi and outer wheel body speed ratio Rvo), and a body speed correction unit 54 which corrects the body speed Vb based on the correction amount calculated by the steering correction amount calculating unit 53.

The acceleration/deceleration calculating unit 51 includes an acceleration force calculating unit 55 which calculates driving force Fe (acceleration) of the automobile V from output of the engine, which is an internal combustion engine, electric motor, or the like, a road grade deceleration force calculating unit 56 which calculates deceleration Fs of the automobile V due to road grade, and a deceleration force calculating unit 57 which calculates deceleration force Fd of the automobile V due to factors other than road grade.

The acceleration force calculating unit 55 calculates the driving force Fe of the automobile V from engine output, using the driving torque Te detected by the torque sensor, and the gear position Pg as input.

The road grade deceleration force calculating unit 56 subtracts the deceleration force Fd calculated by the deceleration force calculating unit 57 from the driving force Fe calculated by the acceleration force calculating unit 55 to obtain an acceleration force. The road grade deceleration force calculating unit 56 then subtracts from thus obtained acceleration force another acceleration force obtained by multiplying the longitudinal acceleration Gx detected by the longitudinal G sensor 10 by the body weight M, thereby calculating the deceleration force Fs due to road grade.

The deceleration force calculating unit 57 includes a braking deceleration force calculating unit 58 which takes the brake fluid pressure Pb of the brake device to calculate the deceleration force of the automobile V regarding braking operations which increases proportionally to the brake fluid pressure Pb, a running resistance calculating unit 59 which calculates deceleration related to running resistance due to body shape and approximate body speed, using the average value of the wheel speed Vw as an approximate body speed, and a feedback resistance calculating unit 60 which calculates running resistance due to wheel speed feedback. The deceleration force calculating unit 57 adds the calculation results of the braking deceleration force calculating unit 58, running resistance calculating unit 59, and feedback resistance calculating unit 60, to calculate the deceleration force Fd of the automobile V due to elements other than road grade.

The vehicle speed calculating unit 52 subtracts the deceleration force Fs calculated at the road grade deceleration force calculating unit 56 from the driving force Fe calculated at the acceleration force calculating unit 55, and also calculates the acceleration/deceleration force F of the automobile V by subtracting therefrom the deceleration force Fd calculated at the deceleration force calculating unit 57. The vehicle speed calculating unit 52 then obtains acceleration by dividing the calculated acceleration/deceleration force F by the body weight M and calculates the body speed Vb by integration thereof. The calculated body speed Vb is input to the body speed correction unit 54.

Now, processing at the acceleration force calculating unit 55 and deceleration force calculating unit 57 will be described in details with reference to FIG. 9. The driving torque Te is input to a multiplying unit 61. The gear position Pg is input to a gear position/shift gear ratio conversion circuit 62. This gear position/shift gear ratio conversion circuit 62 obtains a shift gear ratio Rg by referencing a table based on the gear position Pg, and inputs the output shift gear ratio Rg to the multiplying unit 61. A first wheel speed gain $G_1$ from a later-described first wheel speed gain setting circuit 63 is also input to the multiplying unit 61.

The first wheel speed gain setting circuit 63 sets the first wheel speed gain $G_1$ based on an average wheel speed Vwav which is an average value of the wheel speed of the wheels 3 detected by the wheel speed sensors 9, referencing a reference table. Note that in this example, the first wheel speed gain $G_1$ is deemed to be zero when the average wheel speed Vwav is infinitesimal, and generally constant when the average wheel speed Vwav is greater than a predetermined threshold value. The driving torque Te, shift gear ratio Rg, and first wheel speed gain $G_1$ are multiplied at the multiplying unit 61, thereby calculating a wheel torque Tw which is the output of the driving wheels. The wheel torque Tw is then input to a torque/driving force conversion circuit 64 and divided by the dynamic rolling radius Rd of the tires 2, thereby being converted in to the driving force Fe of the automobile V. The output thereof is input to a subtractor 66 as an addition value, via a gain circuit 65.

Input to the subtractor 66 are the driving force Fe output from the gain circuit 65, and later-described braking force Fb, running resistance force Fr, and feedback resistance force Ffb.

The brake fluid pressure Pb is input to a multiplying unit 67. A second wheel speed gain $G_2$ from a second wheel speed gain setting circuit 68 is also input to the multiplying unit 67. The second wheel speed gain $G_2$ is set by the second wheel speed gain setting circuit 68 referencing a reference table based on the average wheel speed Vway. Note that in this example, the second wheel speed gain $G_2$ is deemed to be zero when the average wheel speed Vwav is infinitesimal, and generally constant when the average wheel speed Vwav is greater than a predetermined threshold value. The brake fluid pressure Pb and second wheel speed gain $G_2$ are multiplied at the multiplying unit 67 to obtain the braking force Fb corresponding to the braking force by the brake devices. The braking force Fb having a positive value is input to the subtractor 66 as a subtraction value.

The average wheel speed Vwav is input to a running resistance force setting circuit 69. The running resistance force setting circuit 69 references a reference table based on the input average wheel speed Vwav to set a running resistance force Fr dependent on vehicle speed (average wheel speed Vwav). The running resistance force Fr having a positive value, that has been calculated at the running resistance force setting circuit 69, is input to the subtractor 66 as a subtraction value.

Further, an average rear wheel speed $Vwav_R$ which is the average wheel speed value of the rear wheels $3_R$ which are following wheels, is input to the feedback resistance calculating unit 60. The feedback resistance calculating unit 60 includes a proportion circuit 72 which sets a running resistance based on proportionate gain, based on each deviation ΔV obtained by subtracting the average rear wheel speed $Vwav_R$ from the body speed Vb input to a subtractor 71, an integrating circuit 73 which sets the running resistance force based on integrated gain, and derivative circuit 74 which sets the running resistance force based on derivative gain. The outputs of the proportion circuit 72, integrating circuit 73, and derivative circuit 74 are input to an adder 75 and added, thereby outputting the feedback resistance force Ffb which is a corrected value from feedback of the body speed Vb. The output feedback resistance force Ffb is input to the subtractor 66 as a subtraction value.

Figure 9:
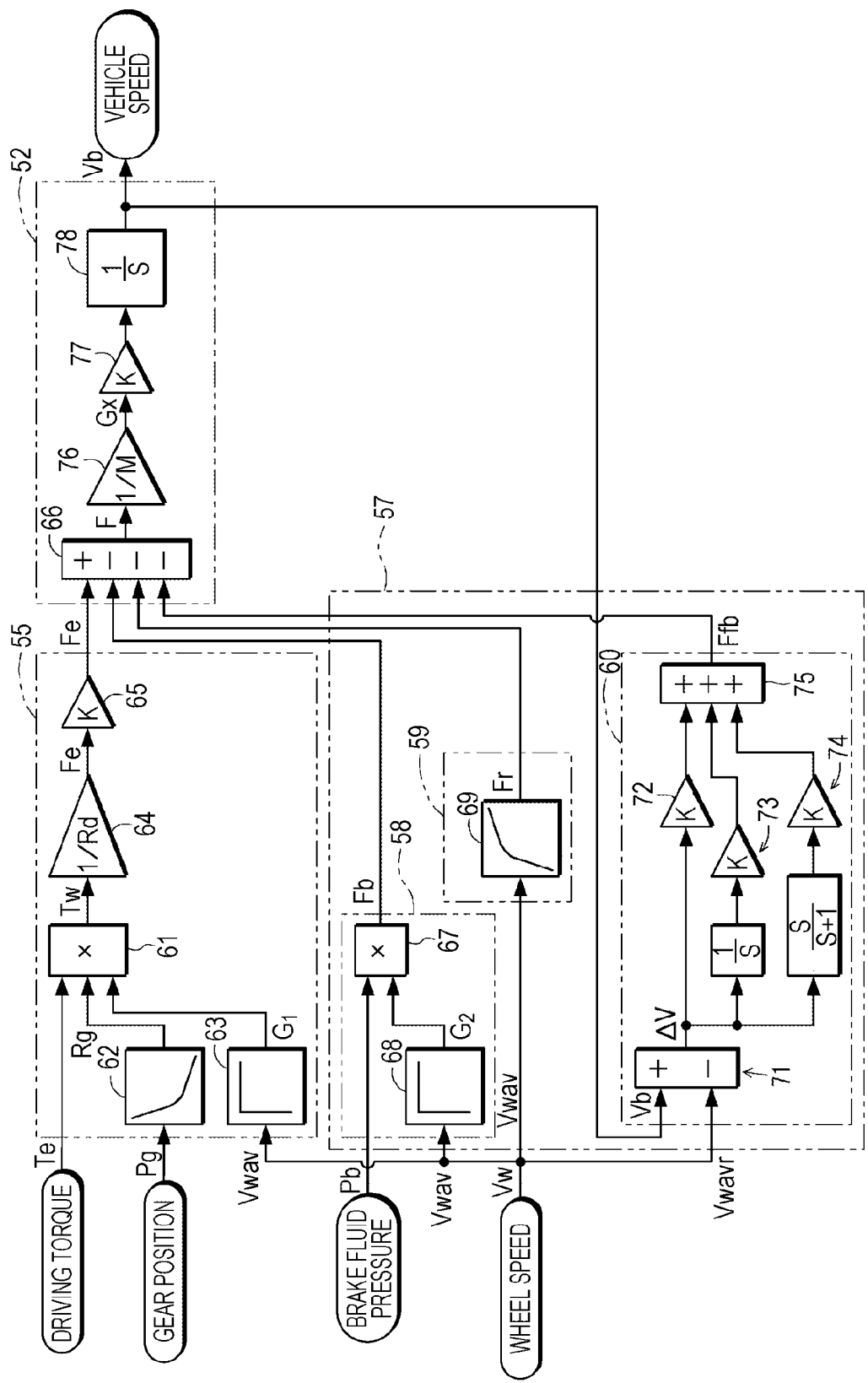
FIG. 9 is a control block diagram of principal portions of the body speed estimating unit illustrated in FIG. 8.

Subtracted from the driving force Fe are the braking force Fb, running resistance force Fr, feedback resistance force Ffb, and the deceleration force Fs due to road grade illustrated in FIG. 8 but not in FIG. 9, to obtain output of acceleration/deceleration force F. This acceleration/deceleration force F is input to a acceleration-deceleration force/acceleration-deceleration speed conversion circuit 76 where the acceleration/deceleration force F is divided by the body weight M, and thus converted into the acceleration/deceleration speed of the vehicle V (longitudinal acceleration Gx). The acceleration/deceleration speed of the vehicle V is input to an integrating unit 78 via a gain circuit 77 and integrated, yielding output of body speed Vb.

Thus, the body speed Vb for correcting the wheel speed Vw can be obtained by calculating the body speed Vb of the vehicle V based on the driving force Fe, braking force Fb, running resistance force Fr, and feedback resistance force Ffb.

Returning to FIG. 8, the steering correction amount calculating unit 53 includes a turning radius calculating unit 79 which calculates the turning radius TR of the vehicle V based on each wheel speed Vw and the yaw rate γ, and an inner/outer wheel vehicle speed ratio calculating unit 80 which calculates the quantity of turning state as a correction amount, i.e., the inner wheel body speed ratio Rvi and outer wheel body speed ratio Rvo which are ratios of the parts of the body corresponding to the inner wheels and outer wheels as to the body speed Vb, based on tread T of the vehicle V and the calculated turning radius TR.

Figure 10:
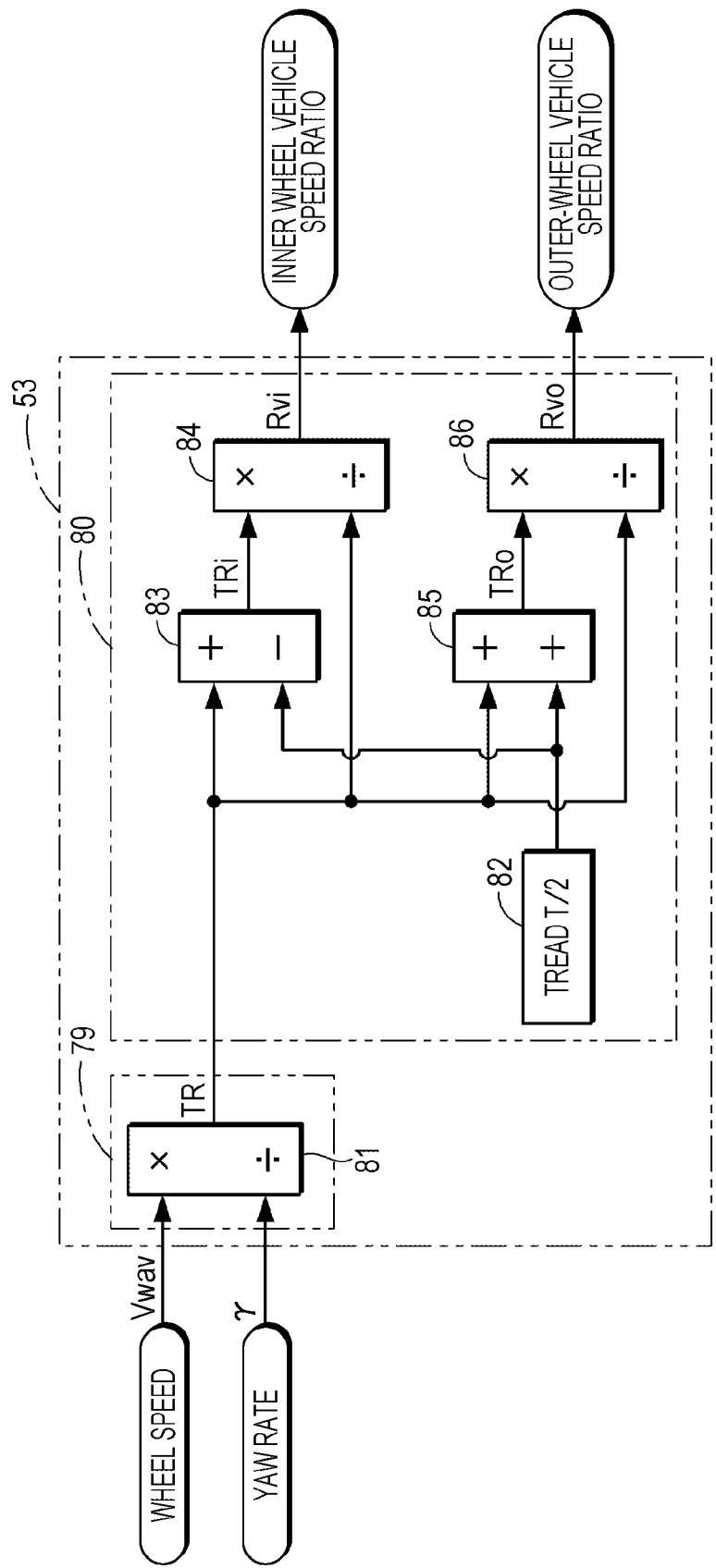
FIG. 10 is a block diagram of the steering correction amount calculating unit illustrated in FIG. 8.

The processing at the steering correction amount calculating unit 53 will now be described in detail with reference to FIG. 10. The average wheel speed Vwav of the wheel speeds Vw detected by each wheel speed sensor 9 is input to a dividing unit 81 as a dividend (numerator). The yaw rate γ which is the detection value of the yaw rate sensor 12 is also input as a divisor (denominator). The dividing unit 81 divides the average wheel speed Vwav of each wheel by the yaw rate γ to calculate the turning radius TR of the vehicle V. Note that in a case where the yaw rate γ is zero when dividing, the value is restricted by a known method such as substituting with a constant, or the like. The calculated turning radius TR is input to a subtractor 83 and adder 85 as an addition value. The subtractor 83 and adder 85 subtract and add, respectively, ½ of the tread T stored in memory 82, from and to the input turning radius TR, thereby calculating inner wheel turn radius TRi and outer wheel turn radius TRo. The outputs from the subtractor 83 and adder 85 are input to dividing units 84 and 86 as dividends. The dividing units 84 and 86 have the turning radius TR of the vehicle V calculated at the dividing unit 81 input thereto as a divisor. The dividing units 84 and 86 divide the inner wheel turn radius TRi and outer wheel turn radius TRo by the turning radius TR of the vehicle V, thereby calculating the inner wheel body speed ratio Rvi and outer wheel body speed ratio Rvo.

The inner wheel body speed ratio Rvi and outer wheel body speed ratio Rvo calculated at the dividing units 84 and 86 are input to the body speed correction unit 54 as illustrated in FIG. 8, where the inner wheel body speed ratio Rvi and outer wheel body speed ratio Rvo are each multiplied by the body speed Vb, thus calculating at the body speed correction unit 54 the inner wheel side body speed Vbi which is the body speed Vb of the part of the vehicle corresponding to the inner wheels, and the outer wheel side body speed Vbo which is the body speed Vb of the part of the vehicle corresponding to the outer wheels. That is to say, the body speed correction unit 54 is a compensating unit to compensate the body speed Vb based on the inner wheel body speed ratio Rvi and outer wheel body speed ratio Rvo.

The body speed Vb is thus corrected in accordance with the turning state of the vehicle V. Accordingly, the body speed Vb at the inner wheel side and outer wheel side (Vbi and Vbo) which changes in accordance with steering operations performed by the driver is accurately calculated.

The inner wheel side body speed Vbi and outer wheel side body speed Vbo are input to the quantity-of-state calculating unit 31, or more accurately the subtractor 35 situated upstream of the band-pass filter 36, as subtraction values, as illustrated in FIG. 4. These values are used for calculation of the wheel speed fluctuation amount ΔVw based on the wheel speed Vw, and also used for removal of wheel speed fluctuation component which occurs due to difference in path length caused by turning radius difference between the inner and outer wheels, as well as vehicle V body speed fluctuation components.

Thus, subtracting the inner wheel side body speed Vbi or outer wheel side body speed Vbo from the wheel speed Vw input at the quantity-of-state calculating unit 31 eliminates the effects of braking/driving of the vehicle V from the wheel speed Vw. Accordingly, the quantity of state of the vehicle V (sprung speed $S_2$ and stroke speed Ss) can be calculated with higher precision. Also, the body speed correction unit 54 corrects the body speed Vb based on the inner wheel body speed ratio Rvi and outer wheel body speed ratio Rvo, whereby the body speed Vb is precisely calculated for each wheel. Accordingly, effects of turning of the vehicle V on the wheel speed Vw are eliminated, so the quantity of state of the vehicle V is calculated more precisely.

Figure 11A:
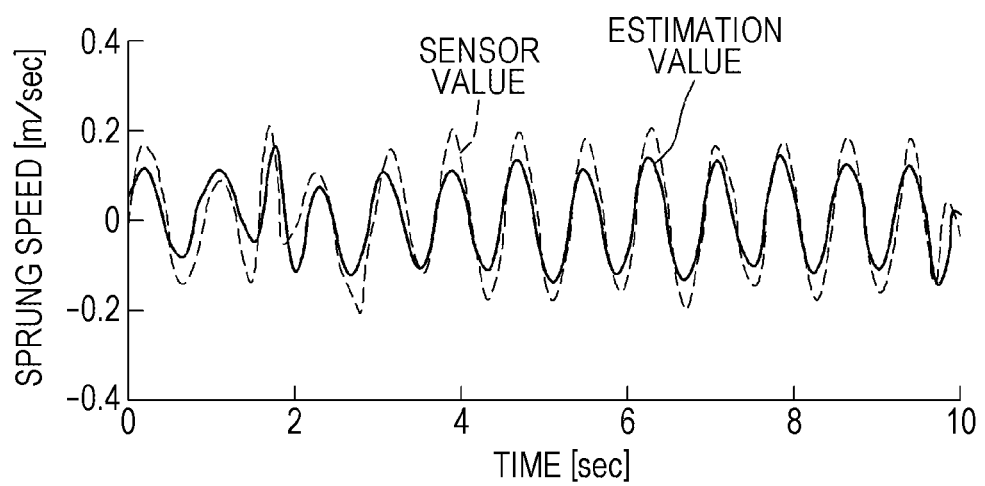
FIGS. 11A and 11B are time charts, where
Figure 11B:
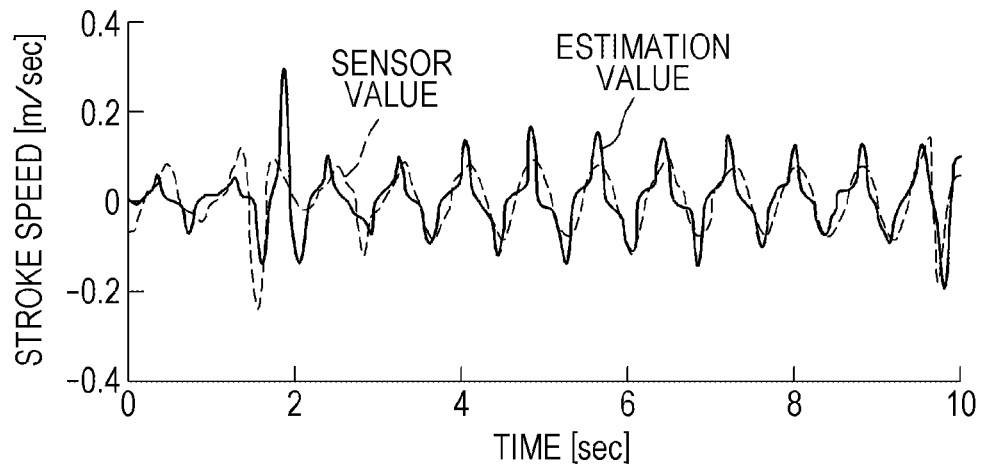

FIG. 11A is a time chart illustrating the sprung speed detected by sensors, and sprung speed $S_2$ calculated by the quantity-of-state calculating unit 31, represented by a dashed line and a solid line, respectively. FIG. 11B is a time chart illustrating the stroke speed detected by sensors, and stroke speed Ss calculated by the quantity-of-state calculating unit 31, represented by a dashed line and a solid line, respectively. As illustrated in FIGS. 11A and 11B, the calculated stroke speed Ss and sprung speed $S_2$ generally match the sensor values, so it can be seen that the quantity-of-state calculating unit 31 can calculate the stroke speed Ss and sprung speed $S_2$ with high precision based on the wheel speed Vw. Also, the unsprung load $u_1$ is calculated based on the wheel speed Vw, and the unsprung load $u_1$ is input to the vehicle model in the present embodiment, so the sprung speed $S_2$ and stroke speed Ss can be calculated regardless of whether the suspension 7 has a caster angle set or not.

First Control Target Current Setting Unit 23

As illustrated in FIG. 3, the first control target current setting unit 23 includes a skyhook control unit 90 which performs skyhook control and sets a skyhook control target current Ash, a first pitch control unit 91 which performs pitch control based on the pitch angular velocity ωp calculated at the four-wheel model calculating unit 34 and sets a first pitch control target current Ap1, a first roll control unit 92 which performs roll control based on the roll angular velocity ωr calculated at the four-wheel model calculating unit 34 and sets a first roll control target current Ar1. The first control target current setting unit 23 also includes a steering angle proportionate control unit 93 which performs roll control based on steering angle δf and sets a steering angle proportionate control target current Asa, an unsprung damping control unit 95 which performs unsprung damping control of the vehicle V and sets an unsprung damping control target control current Au, a minimum target current control unit 96 which sets a minimum target current Amin to generate minimal damping force dependent on vehicle speed, and a first high-current selecting unit 97 and so forth.

The skyhook control unit 90 performs quality-of-ride control (damping control) which suppresses shaking of the vehicle when passing over uneven places on the road, to increase comfort of the ride. The first pitch control unit 91 performs body attitude control to correct the attitude of the body 1 by suppressing pitching during sudden acceleration or sudden deceleration of the automobile V. A roll attitude control unit 94 which is made up of the first roll control unit 92 and steering angle proportionate control unit 93 performs body attitude control to correct the attitude of the body 1 by suppressing rolling of the automobile V when turning. The unsprung damping control unit 95 suppresses vibration of the unsprung components in the resonant region, thereby improving the ground contact of the wheels 3 and improving the quality of the ride.

Skyhook Control Unit 90

Figure 12:
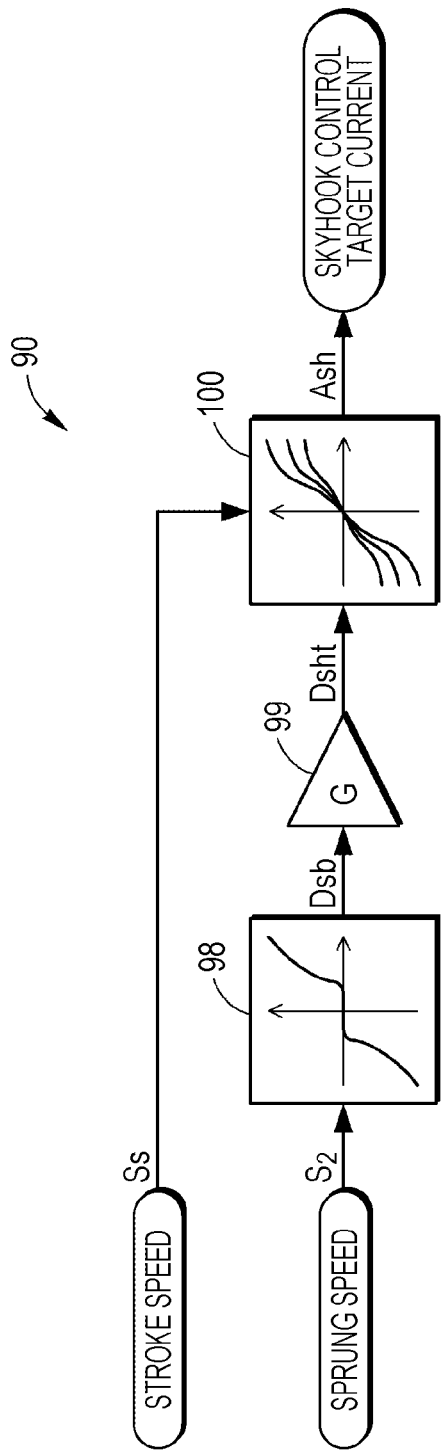
FIG. 12 is a block diagram of the skyhook control computing unit illustrated in FIG. 3.
Figure 13:
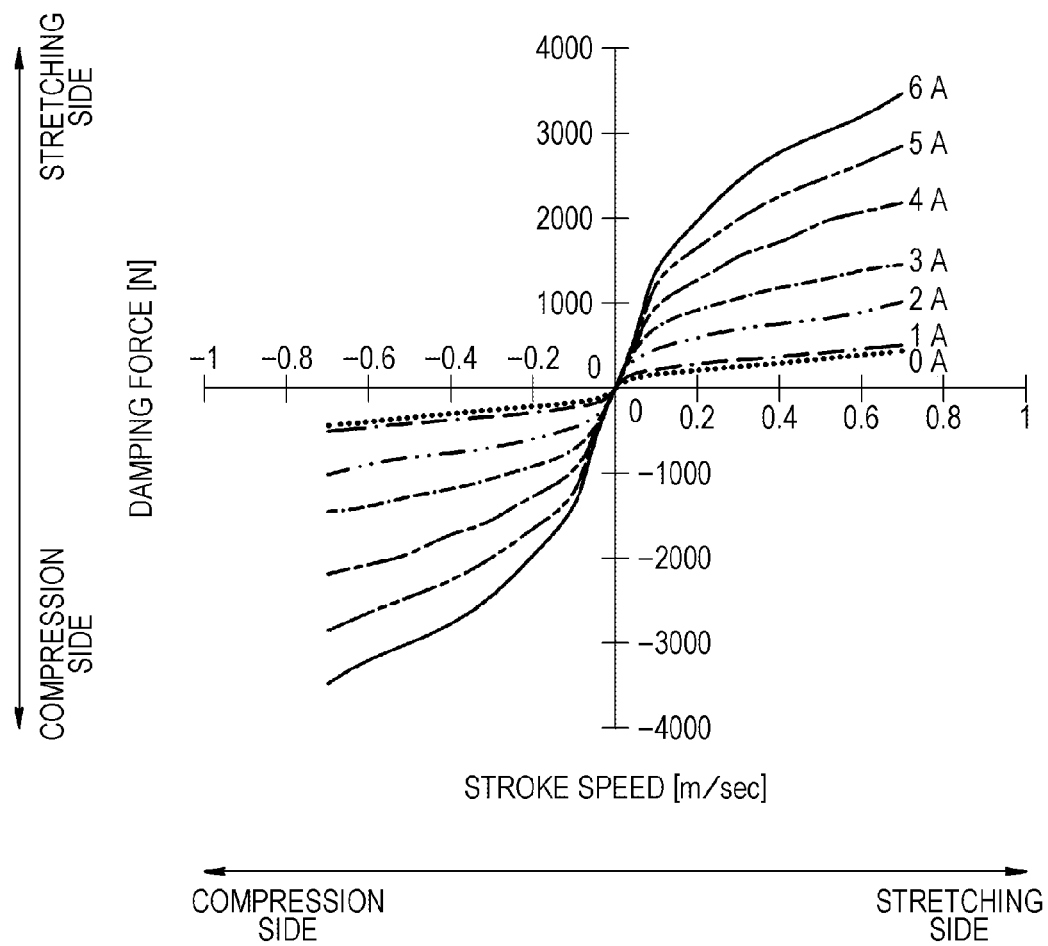
FIG. 13 is a target current map which the target current setting unit illustrated in FIG. 12 uses.

Next, the processing performed by the skyhook control unit 90 will be described in detail with reference to FIGS. 12 and 13. In the skyhook control unit 90, the sprung speed $S_2$ calculated at the quantity-of-state calculating unit 31 in FIG. 3 is input to a damping force base value calculating unit 98. This damping force base value calculating unit 98 sets a damping force base value Dsb by referencing a sprung/damping force map, based on the sprung speed $S_2$ that has been input. The set damping force base value Dsb is input to a gain circuit 99. The gain circuit 99 multiplies the damping force base value Dsb by a skyhook gain Gsh to calculate a skyhook target damping force Dsht. The calculated skyhook target damping force Dsht is input to a target current setting circuit 100. The stroke speed Ss is also input to the target current setting circuit 100, and the target current setting circuit 100 sets a skyhook control target current Ash for each damper 6 by referring to the current map illustrated in FIG. 13, based on the skyhook target damping force Dsht and stroke speed Ss, and outputs the skyhook control target current Ash.

Unsprung Damping Control Unit 95

Figure 14:
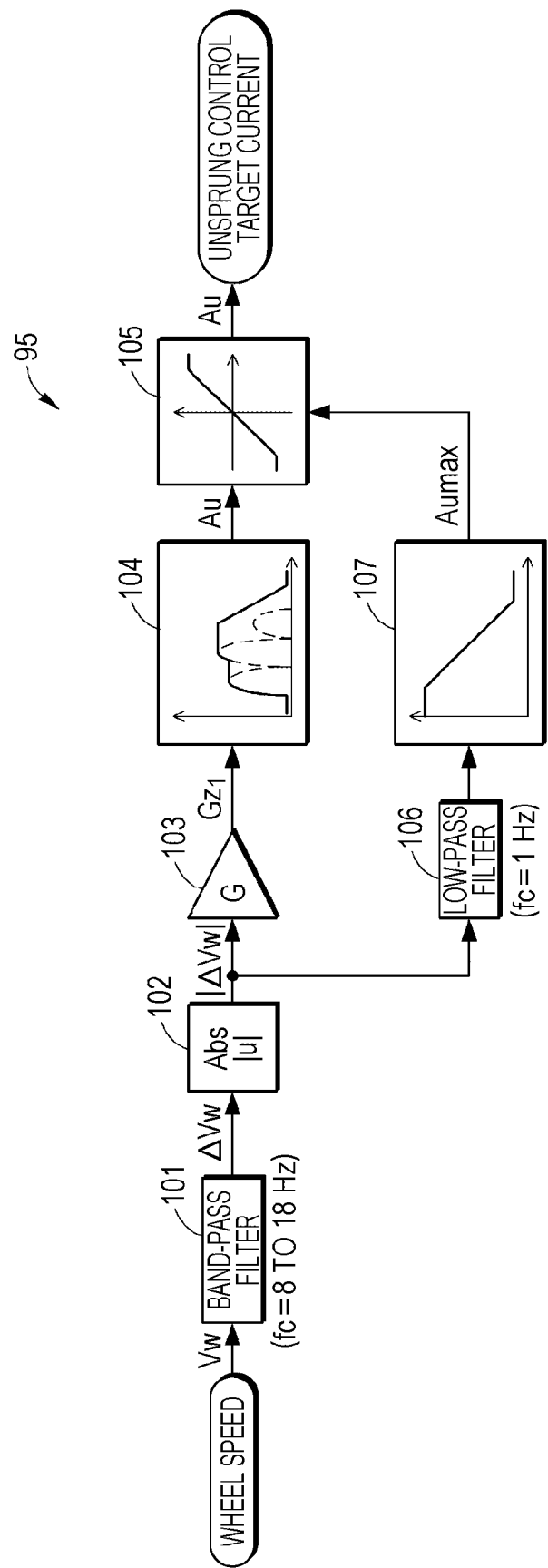
FIG. 14 is a block diagram of the unsprung damping control computing unit illustrated in FIG. 3.

Next, the unsprung damping control unit 95 illustrated in FIG. 3 will be described in detail, with reference to FIGS. 14 through 17. As illustrated in FIG. 14, in the unsprung damping control unit 95, each input wheel speed Vw is input to a band-pass filter 101. The band-pass filter 101 has band-pass properties of 8 to 18 Hz, so as to pass through wheel speed Vw signals of the unsprung resonance region. Accordingly, the band-pass filter 101 extracts signals of a higher frequency range that the 0.5 to 5 Hz frequency range of the band-pass filter 36 (FIG. 4) for skyhook control. The high-frequency side cutoff frequency of the band-pass filter 36 for skyhook control is set at 5 Hz, and the high-frequency side cutoff frequency of the band-pass filter 101 for unsprung damping control is set at 8 Hz. Accordingly, interference between skyhook control and unsprung damping control is prevented by thus providing a band gap between the band-pass filters 36 and 101.

Figure 15A:
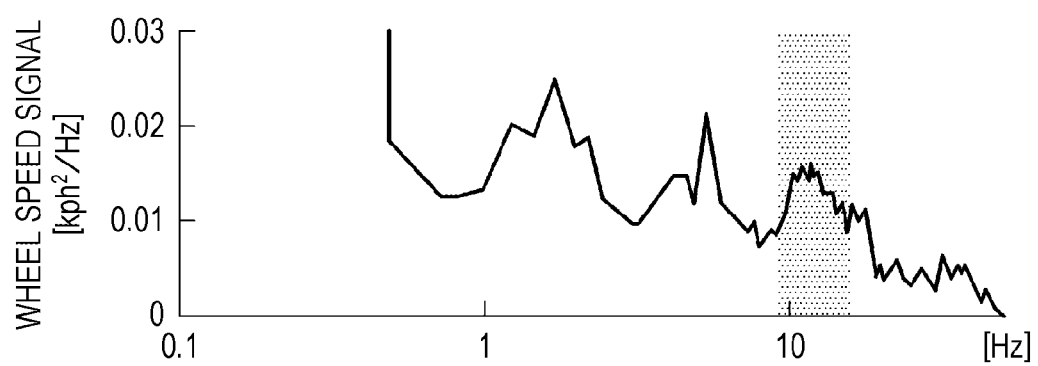
FIGS. 15A and 15B are frequency response graphs comparing wheel speed and unsprung acceleration.
Figure 15B:
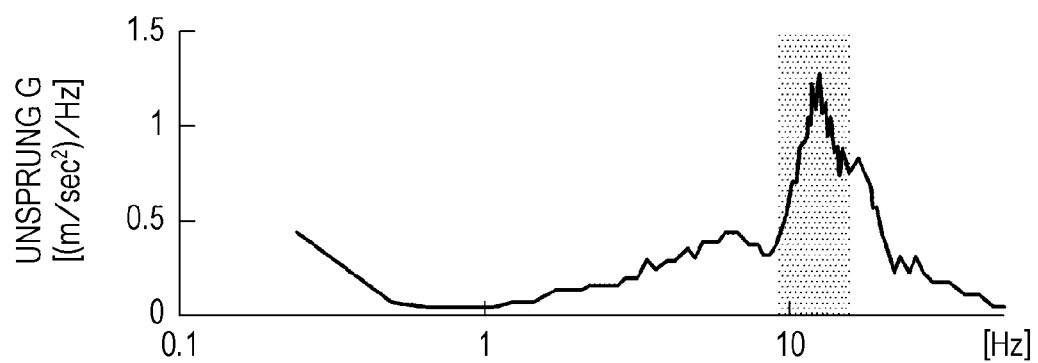

The wheel speed Vw signals input from the CAN 14 also include signals other than from the unsprung resonance region. For example, the wheel speed Vw signals having the frequency properties illustrated in FIG. 15A obtained while driving at 40 kph include unsprung resonance region wheel speed Vw signals such as illustrated in FIG. 15B. Accordingly, passing the wheel speed Vw signals through the band-pass filter 101 corresponding to the unsprung resonance region extracts the wheel speed Vw signals including the unsprung signal component, and accordingly, the DC component can be removed from the wheel speed Vw signals. That is to say, the band-pass filter 101 functions as a wheel speed fluctuation amount extracting unit to extract the wheel speed fluctuation amount $\Delta$Vw based on the wheel speed Vw signals.

The wheel speed fluctuation amount $\Delta$Vw which has passed through the band-pass filter 101 is input to an absolute value computing circuit 102, and converted into the absolute value of wheel speed fluctuation amount $\Delta$Vw. As described earlier, the wheel speed fluctuation amount $\Delta$Vw is proportionate to the unsprung load $u_1$, the unsprung vertical-direction speed obtained by dividing the unsprung load $u_1$ by the unsprung mass $M_1$ is also a value corresponding to the wheel speed fluctuation amount $\Delta$Vw. Accordingly, generating damping force corresponding to the absolute value of the vertical-direction acceleration enables unsprung vibrations to be suppressed.

The wheel speed fluctuation amount $\Delta$Vw output from the absolute value computing circuit 102 is input to a gain circuit 103 and multiplied by a gain, thereby calculating the magnitude (absolute value) of unsprung acceleration $Gz_1$ which is the basic input amount of the automobile V. Specifically, the gain circuit 103 multiples the wheel speed fluctuation amount $\Delta$Vw by a gain value obtained by dividing the proportionality constant k described with regard to FIG. 6, by the unsprung mass $M_1$.

The unsprung acceleration $Gz_1$ output from the gain circuit 103 is input to a target current setting circuit 104, where a calculation current corresponding to the unsprung acceleration $Gz_1$ is calculated, and the unsprung damping control target control current Au used in peak-hold/ramp-down control is set based on this calculation current.

Figure 16A:
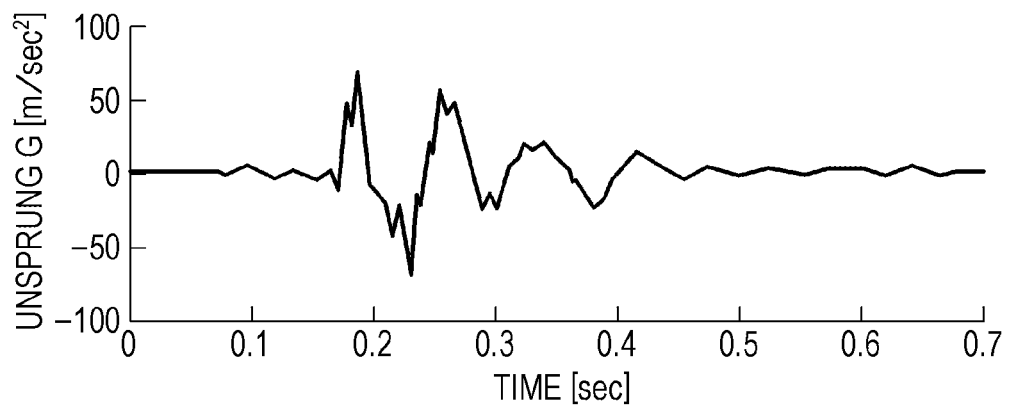
FIGS. 16A and 16B are time charts comparing unsprung acceleration and target current according to the peak-hold/ramp-down circuit illustrated in FIG. 14.
Figure 16B:
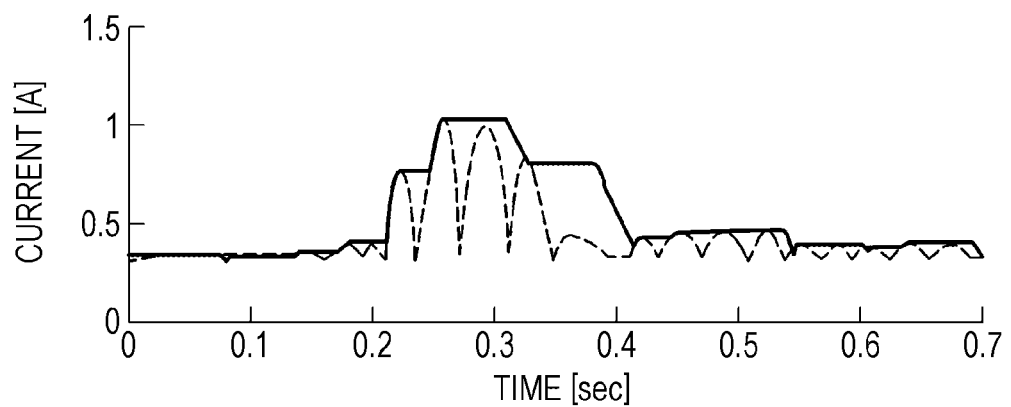

The target current setting circuit 104 sets the unsprung damping control target control current Au such as represented by the solid line in FIG. 16B with regard to the input of unsprung acceleration $Gz_1$ having the properties illustrated in FIG. 16A, based on the calculation current represented by the dashed line in FIG. 16B. Specifically, the target current setting circuit 104 holds the greatest value of the input calculation current as the unsprung damping control target control current Au for a predetermined amount of time, and after the predetermined amount of time has elapsed since input of this greatest value, reduces the value of the unsprung damping control target control current Au at a predetermined gradient. That is to say, in a case where the unsprung acceleration $Gz_1$ increases, the value of the unsprung damping control target control current Au is set so as to respond rapidly to the unsprung acceleration $Gz_1$, while in a case where the unsprung acceleration $Gz_1$ decreases, the unsprung damping control target control current Au is set so as to respond slower than compared with the case of increasing. Accordingly, the unsprung vibrations can be damped in a more effective and stable manner, as compared to a case where the unsprung damping control target control current Au is set according to the calculation current indicated by the dashed line.

Returning to FIG. 14, the unsprung damping control target control current Au output from the target current setting circuit 104 is input to a restricting circuit 105. The restricting circuit 105 restricts the upper limit of the unsprung damping control target control current Au to an upper limit value Aumax, and then outputs the unsprung damping control target control current Au. That is to say, in a case where the input unsprung damping control target control current Au exceeds the upper limit value Aumax, the restricting circuit 105 sets the upper limit value Aumax to be the unsprung damping control target control current Au. Accordingly, this prevents the unsprung damping control target control current Au set in accordance with the magnitude of the wheel speed fluctuation amount $\Delta$Vw from being set to a value exceeding the upper limit value Aumax which has been set taking into consideration the power source capacity of the automobile V and the damping force properties of the dampers 6.

The wheel speed fluctuation amount $\Delta$Vw output from the absolute value computing circuit 102 is input to a low-pass filter 106 besides the gain circuit 103. The low-pass filter 106 here has low-pass properties to pass bands lower than 1 Hz. An upper limit setting circuit 107 sets the upper limit value Aumax in accordance with the absolute value of the wheel speed fluctuation amount $\Delta$Vw which has passed through the low-pass filter 106, and inputs the upper limit value Aumax to the restricting circuit 105. Specifically, in a case where the absolute value of the wheel speed fluctuation amount $\Delta$Vw exceeds the predetermined value, the upper limit value Aumax is set such that the greater the wheel speed fluctuation amount $\Delta$Vw is, the smaller the upper limit value Aumax is.

The restricting circuit 105 changes the upper limit of the unsprung damping control target control current Au in accordance with the input upper limit value Aumax. That is to say, the greater the absolute value of the wheel speed fluctuation amount $\Delta$Vw which has passed through the low-pass filter 106 is, the smaller the upper limit value Aumax is set. The effects thereof will be described next.

Figure 17A:
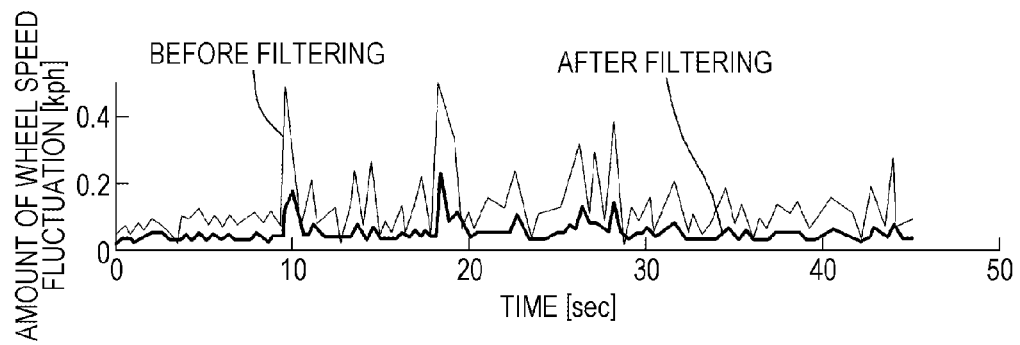
FIGS. 17A and 17B are time charts, where
Figure 17B:
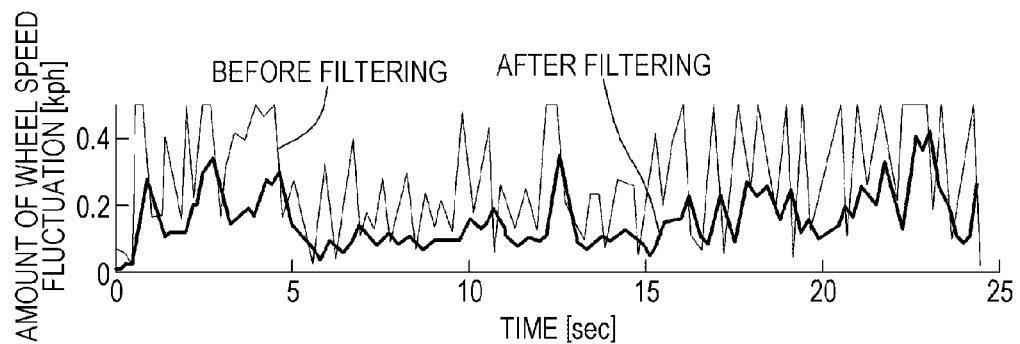

On a relatively smooth paved road, the wheel speed fluctuation amount $\Delta$Vw (absolute value) which has passed through the low-pass filter 106, represented by a solid line in FIG. 17A, is smaller than the wheel speed fluctuation amount $\Delta$Vw before passing through the low-pass filter 106, represented by a light line, and the average value thereof is lower as well. On the other hand, on a rough paved road, the wheel speed fluctuation amount $\Delta$Vw before passing through the low-pass filter 106, represented by a light line, is greater than that on the smooth road, and the wheel speed fluctuation amount $\Delta$Vw which has passed through the low-pass filter 106, represented by a solid line, is also greater that that in FIG. 17A, as can be seen in FIG. 17B. In a case where the absolute value of the wheel speed fluctuation amount $\Delta$Vw which has passed through the low-pass filter 106 is great, the road is deemed to be rough, so the restricting circuit 105 lowers the unsprung damping control target control current Au (weakens the unsprung damping control). This can prevent poor quality of ride due to the unsprung damping control target control current Au being set excessively high.

The unsprung damping control unit 95 is thus configured to set the unsprung damping control target control current Au based on the wheel speed Vw signals, and the unsprung damping control target control current Au can be decided according to the magnitude of the wheel speed fluctuation amount $\Delta$Vw of the unsprung resonance region component. Accordingly, unsprung damping control can be performed without involving other factors such as sprung components or the like.

Returning to FIG. 3, the first high-current selecting unit 97 sets the greatest of the skyhook control target current Ash, first pitch control target current Ap1, first roll control target current Ar1, steering angle proportionate control target current Asa, unsprung damping control target control current Au, and minimum target current Amin, that have been set, to the first target current Atgt1. The first control target current setting unit 23 performs skyhook control, pitch control, roll control, and so forth, and the first high-current selecting unit 97 selects the greatest value from these control target current, which improves ride quality of the automobile V, and also appropriately maintains the pitch attitude and roll attitude of the body 1. Also, the first control target current setting unit 23 performs steering angle proportionate control and unsprung damping control, which maintains the roll attitude of the body 1 even more appropriately, and also prevents deterioration in ride quality due to unsprung vibrations.

Second Control Target Current Setting Unit 24

As illustrated in FIG. 3, the second control target current setting unit 24 includes a second pitch control unit 108 which performs pitch control based on the longitudinal acceleration Gx detected by the longitudinal G sensor 10, and sets a second pitch control target current Ap2, a second roll control unit 109 which performs roll control based on the lateral acceleration Gy detected by the lateral G sensor 11, and sets a second roll control target current Ar, and a second high-current selecting unit 110.

Figure 18:
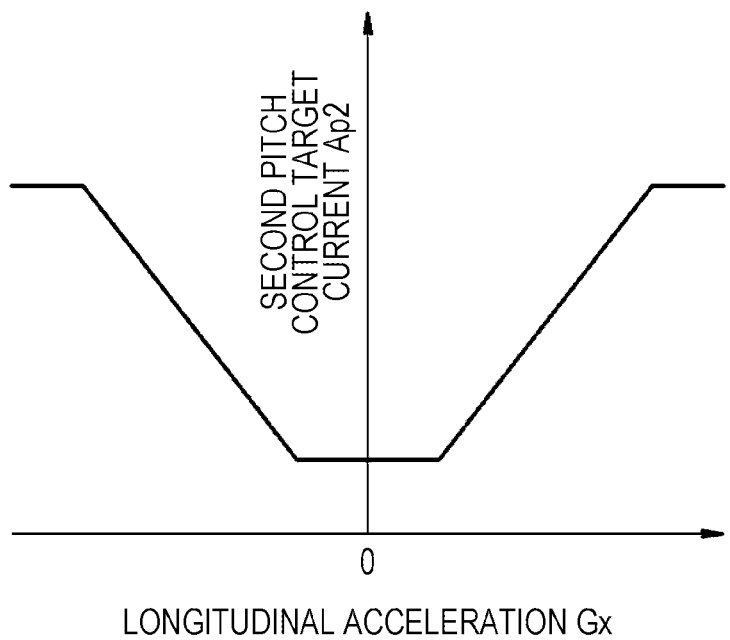
FIG. 18 is a target current map which the second pitch control unit illustrated in FIG. 3 uses.

When one of the VSA, ABS, and TCS is operating as described later, the second pitch control unit 108 performs body attitude control to correct the attitude of the body 1 by suppressing pitching during sudden acceleration or sudden deceleration of the automobile V. Specifically, the second pitch control unit 108 sets the second pitch control target current Ap2 for each damper 6 by referencing the current map illustrated in FIG. 18, based on the longitudinal acceleration Gx detected by the longitudinal G sensor 10, and outputs the second pitch control target current Ap2. This current map is such that the greater the absolute value of the longitudinal acceleration Gx is, the greater the second pitch control target current Ap2 is, and in a case where the absolute value of the longitudinal acceleration Gx is smaller than a predetermined value, a predetermined minimum current value greater than 0 A is set. Thus, pitching motion of the body 1 is effectively suppressed.

Figure 19:
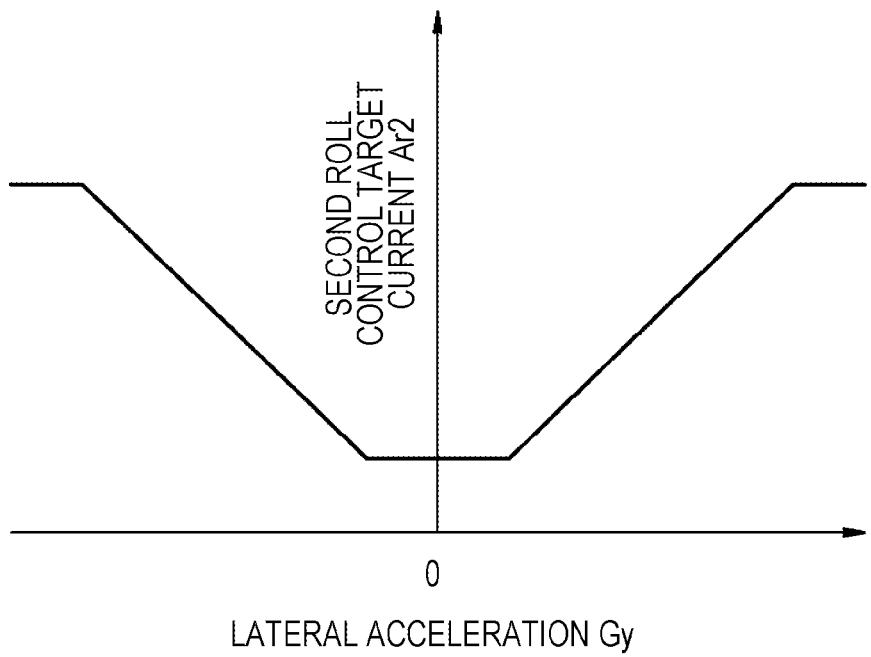
FIG. 19 is a target current map which the second roll control unit illustrated in FIG. 3 uses.

When one of the VSA, ABS, and TCS is operating as described later, the second roll control unit 109 performs body attitude control to correct the attitude of the body 1 by suppressing rolling of the automobile V when turning. Specifically, the second roll control unit 109 sets the second roll control target current Ar2 for each damper 6 by referencing the current map illustrated in FIG. 19, based on the lateral acceleration Gy detected by the lateral G sensor 11, and outputs the second roll control target current Ar2. This current map is such that the greater the absolute value of the lateral acceleration Gy is, the greater the second roll control target current Ar2 is, and in a case where the absolute value of the lateral acceleration Gy is smaller than a predetermined value, a predetermined minimum current value greater than 0 A is set. Thus, rolling motion of the body 1 is effectively suppressed.

The second high-current selecting unit 110 selects the greater value of the second pitch control target current Ap2 and second roll control target current Ar2 to be a second target current Atgt2. Accordingly, even in cases where behavior of the vehicle, of which the dampers 6 are controlled using the second target current Atgt2, is unstable, the attitude of the body 1 is corrected, and thrashing of unsprung components can be effectively prevented.

Switchover Signal Output Unit 25

As illustrated in FIG. 3, in a case where an operating signal indicating that one of the VSA, ABS, and TCS is operating is being input to the input unit 21, the switchover signal output unit 25 determines that the behavior of the automobile V is unstable, and outputs a switchover signal Sc. The output switchover signal Sc is input to the damper control unit 26.

Damper Control Unit 26

The damper control unit 26 receives input of the first target current Atgt1, second target current Atgt2, and switchover signal Sc. In a case where the switchover signal Sc is not being input, the damper control unit 26 controls damping force of the dampers 6 by generating driving current for the dampers 6 based on the first target current Atgt1 which the first high-current selecting unit 97 has set. On the other hand, in a case where the switchover signal Sc is input, the damper control unit 26 controls damping force of the dampers 6 by generating driving current for the dampers 6 based on the second target current Atgt2 set by the second high-current selecting unit 110. That is to say, in a case where none of the VSA, ABS, and TCS is operating in a stable running state, the damper control unit 26 controls the damping force of the dampers 6 based on the first target current Atgt1 set by the first high-current selecting unit 97. On the other hand, in a case where one or more of the VSA, ABS, and TCS is operating in an unstable running state, the damper control unit 26 controls the damping force of the dampers 6 based on the second target current Atgt2 set by the second high-current selecting unit 110.

The damper control unit 26 switches between the first target current Atgt1 and second target current Atgt2 depending on whether or not there is input of the switchover signal Sc. An arrangement may be made where switching from the first target current Atgt1 to the second target current Atgt2, or switching from the second target current Atgt2 to the first target current Atgt1, the damper control unit 26 changes the target current Atgt gradually.

Damping Force Control Procedures

The ECU 8 configured thus performs damping force control following the basic procedures described below. Upon the automobile V starting to travel, the ECU 8 executes the damping force control of which procedures are illustrated in the flowchart in FIG. 20, at predetermined processing intervals (e.g., 10 ms). Once the damping force control starts, the ECU 8 computes the unsprung load $u_1$ for each wheel, based on detection values of the wheel speed sensors 9 and so forth. The ECU 8 also computes the running quantity of state of the automobile V (sprung speed $S_2$ and stroke speed Ss at each wheel, roll angular velocity ωr, and pitch angular velocity ωp of the body 1) based on the unsprung load $u_1$ that has been calculated and the detection values of the lateral G sensor 11 (step ST1).

Next, the ECU 8 calculates the skyhook control target current Ash for each damper 6, based on the sprung speed $S_2$ and stroke speed Ss (step ST2), calculates the first pitch control target current Ap1 for each damper 6 based on the pitch angular velocity ωp of the body 1 (step ST3), and calculates the first roll control target current Ar1 for each damper 6 based on the roll angular velocity ωr of the body 1 (step ST4). The ECU 8 then calculates the steering angle proportionate control target current Asa of each damper 6 based on the steering angle δf (step ST5), calculates the unsprung damping control target control current Au for each damper 6 based on the wheel speed Vw of each wheel (step ST6), and calculates the minimum target current Amin for each damper 6 based on the wheel speed Vw of each wheel (step ST7). Note that the processing of steps ST2 through ST7 do not have to be performed in this order. Alternatively, these steps may be performed in parallel. The ECU 8 selects the greatest of these six control target currents Ash, Ap1, Ar1, Asa, Au, and Amin, and set this to the first target current Atgt1 (step ST8).

Subsequently, the ECU 8 calculates the second pitch control target current Ap2 based on the detection value of the longitudinal G sensor 10 (step ST9), and calculates the second roll control target current Atgt2 of the damper 6 based on the detection value of the lateral G sensor 11 (step ST10). Note that the processing of steps ST9 and ST10 do not have to be performed in this order. Alternatively, these steps may be performed in parallel. Next, the ECU 8 selects the greater of the two control target currents Ap2 and Ar1, and sets this to the second target current Atgt2 (Step ST11). The processing of steps ST9 through ST11 may be performed before the processing of steps ST2 through ST8, or may be performed in parallel with the processing of steps ST2 through ST8.

Thereafter, the ECU 8 determines whether or not there is input of the switchover signal Sc (step ST12), and if the determination result is No (i.e., none of the VSA, ABS, and TCS are operating), outputs a driving current to the MLV coil of each damper 6 based on the first target current Atgt1 selected in step ST8 (step ST13). Thus, appropriate target damping force is set in accordance with the load on the dampers 6 in the damping force control, thereby realizing improved operating stability and quality of ride.

On the other hand, if the determination result in step ST12 is Yes (i.e., at least one of the VSA, ABS, and TCS is operating), the ECU 8 outputs a driving current to the MLV coil of each damper 6 based on the second target current Atgt2 selected in step ST11 (step ST14). Thus, in a case where one of the VSA, ABS, and TCS is operating, a situation can be prevented in which the first target current Atgt1 selected in step ST8 suddenly changes and the vehicle behavior becomes unstable. Also, pitch control and roll control are performed in accordance with the longitudinal acceleration Gx and lateral acceleration Gy, so that the attitude of the body 1 is appropriately controlled, and thrashing of unsprung components can be prevented.

Figure 20:
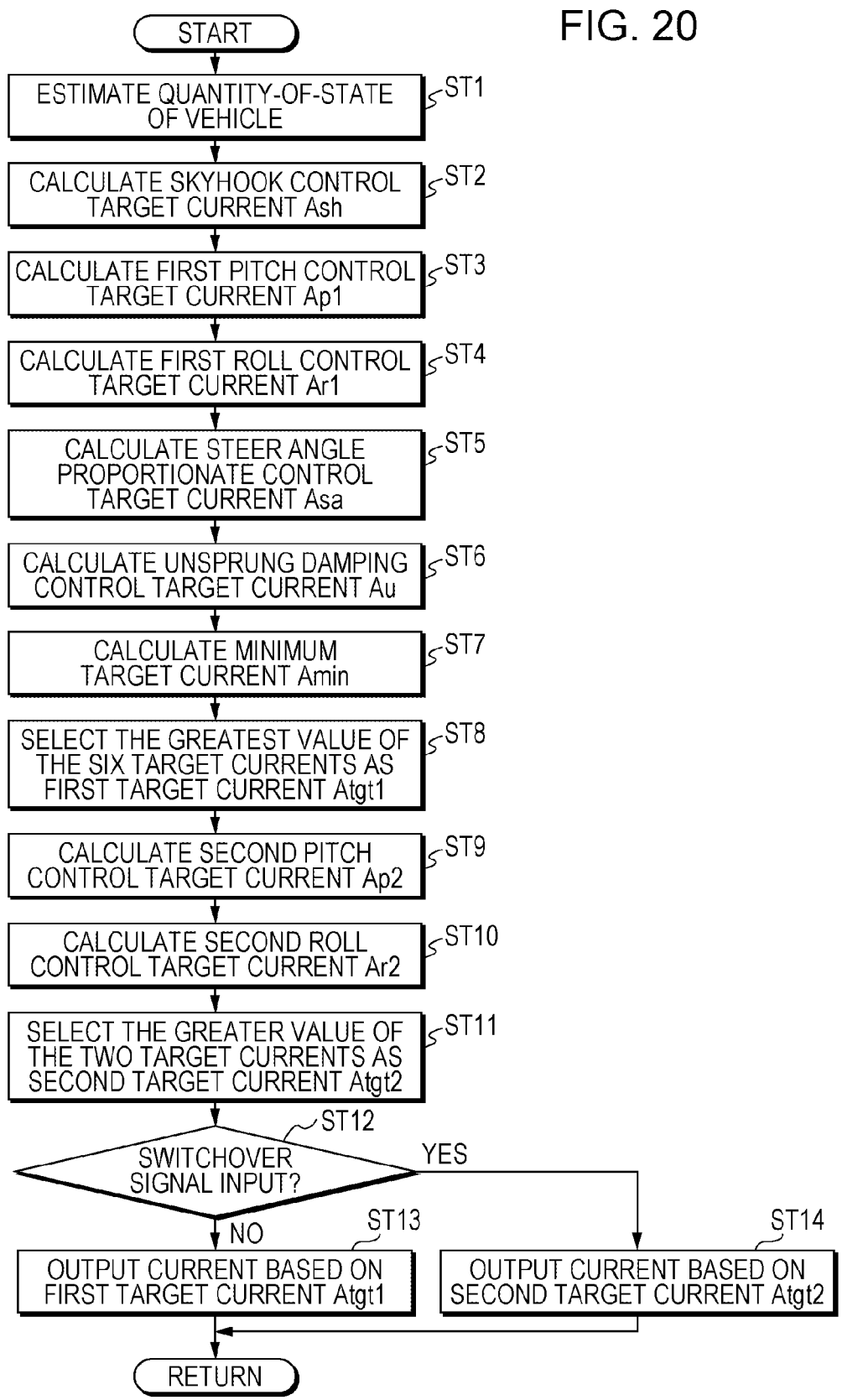
FIG. 20 is a flowchart illustrating procedures of the damping force control performed by the suspension control device illustrated in FIG. 3.

While detailed description by way of specific embodiments will end here, it should be noted that the present disclosure is not restricted to the above embodiment, and that a broad range of modifications may be made. For example, the switchover signal Sc output from the switchover signal output unit 25 is input to the damper control unit 26, as illustrated in FIG. 3. Accordingly, as illustrated in FIG. 20, the ECU 8 sets the first target current Atgt1 in steps ST1 through ST8 and sets the second target current Atgt2 in steps ST9 through ST11, following which the first target current Atgt1 is selected (step ST13) or the second target current Atgt2 is selected (step ST14) based on whether or not there is input of the switchover signal Sc (step ST12). Alternatively, an arrangement may be made wherein, in FIG. 3, the switchover signal Sc is input to the vehicle quantity-of-state estimation unit 22, first control target current setting unit 23, and second control target current setting unit 24. In this case, of the routines illustrated in FIG. 20, the determination processing of step ST12 can be performed first, and thereafter only one of the processing of setting the first target current Atgt1 in steps ST1 through ST8 and setting the second target current Atgt2 in steps ST9 through ST11 has to be performed.

Also, while in the above embodiment the first target current Atgt1 is set in step ST8 based on the six control target currents Ash, Ap1, Ar1, Asa, Au, and Amin set in steps ST2 through ST7, an arrangement may be made where at least one control target current calculated based on the wheel speed fluctuation amount ΔVw (e.g., skyhook control target current Ash) is used to set the first target current Atgt1. Alternatively, an arrangement may be made where multiple control target currents calculated based on the wheel speed fluctuation amount ΔVw (e.g., skyhook control target current Ash, first pitch control target current Ap1, and first roll control target current Ar1) are used to set the first target current Atgt1.

Description has been made in the above embodiment that the ECU 8 has the switchover signal output unit 25, and the switchover signal output unit 25 outputs the switchover signal Sc to the damper control unit 26 in a case where one of the VSA, ABS, and TCS is operating, but an arrangement may be made where the switchover signal output unit 25 is omitted, and operating signals of the VSA, ABS, and TCS are input directly to the damper control unit 26. Also specific configurations and placement of various members and parts, specific control procedures, and so forth, can be changed as suitable without departing from the essence of the present disclosure. It should be noted that not all the components described in the embodiment are indispensable, and can be selected as appropriate. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

What is claimed is:

1. A suspension control device for a vehicle having a variable-damping-force damper of which the damping force is adjustable based on input signals, the suspension control device comprising:

a wheel speed sensor configured to detect wheel speed of the vehicle;

a basic input amount calculating controller configured to calculate a basic input amount of the vehicle, based on wheel speed fluctuation amount in the wheel speed detected by the wheel speed sensor;

a first target current setting controller configured to set a first target current for the variable-damping-force damper, based on the basic input amount;

an acceleration sensor configured to detect a body acceleration of the vehicle;

a second target current setting controller configured to set a second target current for the variable-damping-force damper, based on the body acceleration detected by the acceleration sensor;

a vehicle behavior controller which controls behavior of the vehicle; and a damper controller configured to control damping force of the variable-damping-force of damper, based on at least one of the first target current and the second target current;

wherein the damper controller controls the damping force of the variable-damping-force damper based on the first target current when the vehicle behavior controller is not operating, and controls the damping force of the variable-damping-force damper based on the second target current when the vehicle behavior controller is operating.

2. The suspension control device according to claim 1, wherein the acceleration sensor includes a longitudinal acceleration sensor configured to detect a longitudinal acceleration in the longitudinal direction of the vehicle, and a lateral acceleration sensor configured to detect a lateral acceleration in the lateral direction of the vehicle;

and wherein the second target current setting controller includes:

a second pitch controller configured to set a second pitch control target current based on the detected longitudinal acceleration of the vehicle, a second roll controller configured to set a second roll control target current based on the detected lateral acceleration of the vehicle, and a third target current selecting controller configured to select greater one of the second pitch control target current and the second roll control target current as the second target current.

3. The suspension control device according to claim 2, wherein the second pitch controller sets the second pitch control target current such that the greater the longitudinal acceleration of the vehicle is, the greater the second pitch control target current is.

4. The suspension control device according to claim 2, wherein the second roll controller sets the second roll control target current such that the greater the lateral acceleration of the vehicle is, the greater the second roll control target current is.

5. The suspension control device according to claim 1, wherein the first target current setting controller includes a quantity-of-state calculating controller configured to calculate a quantity of state of the vehicle by inputting the basic input amount to a vehicle model representing behavior of the vehicle, and a skyhook controller configured to set a skyhook control target current based on the quantity of state of the vehicle;

and wherein the first target current setting controller sets the first target current based on the skyhook control target current.

6. The suspension control device according to claim 5, wherein the quantity of state of the vehicle includes a sprung speed and a stroke speed of a suspension of the vehicle.

7. The suspension control device according to claim 1, wherein the first target current setting controller includes a first pitch controller configured to set a first pitch control target current based on the basic input amount;

and wherein the first target current setting controller sets the first target current based on the first pitch control target current.

8. The suspension control device according to claim 1, wherein the first target current setting controller includes a first roll controller configured to set a first roll control target current based on the basic input amount;

and wherein the first target current setting controller sets the first target current based on the first roll control target current.

9. The suspension control device according to claim 1, wherein the basic input amount is an unsprung load of a suspension of the vehicle.

10. The suspension control device according to claim 1, wherein the vehicle behavior controller includes at least one of an antilock brake system, a traction control system, and a vehicle stability assist control system, and wherein the damper controller determines if the vehicle behavior controller is operating or not.

11. A suspension control method for a vehicle having a variable-damping-force damper of which the damping force is adjustable based on input signals, the method comprising:

(i) calculating, by using a computer, a basic input amount of the vehicle, based on wheel speed fluctuation amount in wheel speed detected by a wheel speed sensor;

(ii) setting, by using the computer, a first target current for the variable-damping-force damper, based on the basic input amount;

(iii) setting, by using the computer, a second target current for the variable-damping-force damper, based on a body acceleration detected by an acceleration sensor;

(iv) determining, by using the computer, whether a vehicle behavior controller is operating; and (v) controlling, by using the computer, the damping force of the variable-damping-force damper based on the first target current when the vehicle behavior controller is not operating, and when the vehicle behavior controller is operating, controlling the damping force of the variable-damping-force damper based on the second target current.

* * * * *